US012762039B2

(12) United States Patent
Kremer Garcia et al.

(10) Patent No.: US 12,762,039 B2
(45) Date of Patent: Oct. 13, 2026

(54) CHARACTERIZATION, ANALYSIS AND CATEGORIZATION OF QUANTUM PROGRAMS WITHOUT EXECUTING THEM

(71) Applicant: International Business Machines Corporation, Armonk, NY (US)

(72) Inventors: David Kremer Garcia, Madrid (ES); Alexandra Rivero García, La Orotava (ES); Juan Cruz Benito, Salamanca (ES); Ivan Duran Martinez, Elmsford, NY (US); Francisco Jose Martin Fernandez, Ridgefield, CT (US); Ismael Faro Sertage, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 272 days.

(21) Appl. No.: 18/614,079

(22) Filed: Mar. 22, 2024

(65) Prior Publication Data

US 2025/0217267 A1 Jul. 3, 2025

(30) Foreign Application Priority Data

Jan. 3, 2024 (EP) .................................... 24382003

(51) Int. Cl.
*G06F 11/3604* (2025.01)
*G06N 10/70* (2022.01)

(52) U.S. Cl.
CPC ......... *G06F 11/3608* (2013.01); *G06N 10/70* (2022.01)

(58) Field of Classification Search
CPC ............................ G06F 11/3608; G06N 10/70
(Continued)

(56) References Cited

U.S. PATENT DOCUMENTS 7,730,031 B2 6/2010 Forster
8,316,359 B2 * 11/2012 Lin .......................... G06F 8/34 717/148

(Continued)

FOREIGN PATENT DOCUMENTS

CN 114358216 A 3/2022
CN 114819168 A 7/2022

OTHER PUBLICATIONS

Bhat et al., "Quantum Computing: Fundamentals, Implementations and Applications", IEEE, pp. 1-17 (Year: 2022).*

(Continued)

*Primary Examiner* — Anil Khatri

(74) *Attorney, Agent, or Firm* — Amin, Turocy & Watson, LLP

(57) ABSTRACT

Various systems and methods are presented herein regarding automatically utilizing characterized codes to characterize an undefined code. The undefined code can be computer instructions for implementation with a quantum computing system. Characterizing the undefined code with previously characterized codes enables knowledge of the undefined code to be acquired without the undefined code having to be executed on the quantum computing system. Prior to characterizing the undefined code, the undefined code can be converted from an original format (e.g., high-level language) to a secure format (e.g., low-level language), wherein the secure format cannot be reverse engineered back to the original format. The undefined code can be represented as a vector, with characterization based on a characterized code having a similar vector representation as the vector representation of the undefined code.

20 Claims, 10 Drawing Sheets

(58) Field of Classification Search
USPC .................................................. 717/120–140
See application file for complete search history.

(56) References Cited

U.S. PATENT DOCUMENTS

| | | | | |
|---|---|---|---|---|
| 8,463,799 | B2 * | 6/2013 | Davis | G06F 16/951 707/752 |
| 8,464,204 | B1 * | 6/2013 | Thornton | G06F 11/3604 717/100 |
| 8,572,560 | B2 | 10/2013 | Drissi et al. | |
| 9,092,229 | B2 | 7/2015 | Aljammaz et al. | |
| 10,261,789 | B2 * | 4/2019 | Reid | G06F 15/78 |
| 11,074,055 | B2 | 7/2021 | Byrne et al. | |
| 11,244,241 | B1 * | 2/2022 | Gambetta | G06N 10/00 |
| 11,347,500 | B2 | 5/2022 | Krishnamoorthy et al. | |
| 11,586,966 | B2 | 2/2023 | Sharma et al. | |
| 11,599,450 | B2 * | 3/2023 | Geller | G06N 10/70 |
| 11,790,259 | B2 * | 10/2023 | Harris | G06F 15/7867 257/31 |
| 12,165,004 | B2 * | 12/2024 | Pichler | B82Y 10/00 |
| 12,287,726 | B2 * | 4/2025 | Li | G06F 11/3608 |
| 12,555,014 | B1 * | 2/2026 | Retzker | G06N 10/40 |
| 12,561,310 | B2 * | 2/2026 | Li | G06F 16/2365 |
| 2020/0104739 | A1 | 4/2020 | Sharma | |
| 2022/0188949 | A1 * | 6/2022 | Mulligan | G06Q 50/18 |

OTHER PUBLICATIONS

Serrano et al., "Quantum Software Components and Platforms: Overview and Quality Assessment", ACM, pp. 1-31 (Year: 2022).*

Alon et al, "code2vec: Learning Distributed Representations of Code", ACM, pp. 1-29 (Year: 2019).*

Bui et al , "Hierarchical Learning of Cross-Language Mappings through Distributed Vector Representations for Code", ACM, pp. 1-4 (Year: 2018).*

Kovalenko et al, "Building Implicit Vector Representations of Individual Coding Style", ACM, pp. 1-8 (Year: 2020).*

Burgholzer et al., "QCEC: A JKQ tool for quantum circuit equivalence checking" Software Impacts 7 (2021) 100051 Dec. 2020 (4 pages).

Gomaa et al., "A survey of text similarity approaches. international journal of Computer Applications" 68(13), 13-18. (2013).

Jurafsky, D. (2000). Speech & language processing. Pearson Education India.

Manning, C., & Schutze, H. (1999). Foundations of statistical natural language processing. MIT press.

Mikolov, T., Chen, K., Corrado, G., & Dean, J. (2013). Efficient estimation of word representations in vector space. arXiv preprint arXiv:1301.3781.

Manning, C. D., Raghavan, P., & Schtze, H. (2008). Document and query weighting schemes. Introduction to Information Retrieval, 128.

Yun-tao, Z., Ling, G., & Yong-cheng, W. (2005). An improved TF-IDF approach for text classification. Journal of Zhejiang University-Science A, 6(1), 49-55.

Qaiser, S., & Ali, R. (2018). Text mining: use of TF-IDF to examine the relevance of words to documents. International Journal of Computer Applications, 181(1), 25-29.

Janzing, D., Wocjan, P., & Beth, T. (2003). Identity check is QMA-complete. arXiv. org. arXiv preprint quant-ph/0305050.

Sun, W., & Wei, Z. (2022). Equivalence checking of quantum circuits by nonlocality. npj Quantum Information, 8(1), 139.

* cited by examiner

CHARACTERIZATION, ANALYSIS AND CATEGORIZATION OF QUANTUM PROGRAMS WITHOUT EXECUTING THEM

BACKGROUND

The subject disclosure relates to automatically characterizing quantum programs for application in a quantum computing environment.

SUMMARY

The following presents a summary to provide a basic understanding of one or more embodiments described herein. This summary is not intended to identify key or critical elements, or delineate any scope of the different embodiments and/or any scope of the claims. The sole purpose of the Summary is to present some concepts in a simplified form as a prelude to the more detailed description presented herein.

In one or more embodiments described herein, systems, devices, computer-implemented methods, methods, apparatus and/or computer program products are presented that facilitate utilizing previously characterized computer codes to automatically characterize an uncharacterized computer code.

According to one or more embodiments, a system is provided to characterize computer code. The system can comprise a memory operatively coupled to the system, wherein the memory stores computer executable components and a processor that executes the computer executable components stored in the memory. The computer executable components can comprise a characterization component configured to receive a first code, wherein the first code is configured to be implemented in a quantum computing system, and further compare the first code with a collection of characterized codes to identify a second code in the collection of characterized codes, wherein the second code has functionality similar to the first code. The characterization component can be further configured to characterize the first code with the second code by assigning the characterization of the second code to the first code. In an embodiment, the first code has not been previously implemented on the quantum computing system. In another embodiment, the second code can have an assigned attribute, the assigned attribute identifies at least one of content or functionality of the second code, and wherein characterizing the first code further comprises applying the assigned attribute of the second code as a first attribute of the first code.

In another embodiment, the computer executable components can further comprise a vector component configured to represent each respective code in the collection of characterized codes with a respective vector and further represent the first code with a first vector representation.

In a further embodiment, the computer executable components can further comprise a similarity component configured to determine similarity between the first vector representation and each respective vector in the collection of characterized codes, and further identify the respective vector in the collection of characterized codes having a vector value most similar to the vector value of the first vector representation. In another embodiment, the similarity component can be further configured to determine whether the value of the identified respective vector has a similarity sufficiently similar to the value of the first vector representation, and in response a determination that the identified respective vector and the first vector representation are sufficiently similar, characterize the first vector with a characterization of the identified respective vector. In another embodiment, the similarity component can be further configured to, in response to a determination that the identified respective vector and the first vector representation have insufficient similarity, identify the first vector as having functionality that is not represented by any of the respective vectors in the collection of vectors.

In a further embodiment, the computer executable components can further comprise a recommendation component configured to identify at least one component required by the first code to implement the first code on the quantum computing system, determine whether the quantum computing system includes the at least one component, and, in response to a determination that the quantum computing system does not include the at least one component, recommend incorporation of the at least one component into the quantum computing system.

In another embodiment, the recommendation component can be further configured to identify a function to be performed by the first code when implemented on the quantum computing system, determining whether the quantum computing system can perform the function in a more efficient manner than the implementation presented in the first code, and, in response to a determination that a more efficient manner to achieve the function performed by the quantum computing system, amending the first code to recite the more efficient manner to achieve the function.

In a further embodiment, the computer executable components can further comprise a parse component configured to parse the first code to identify a portion of code within the first code, extract the portion of code, and compare the portion of code with the collection of characterized codes. The parse component can be further configured to identify a third code in the collection of characterized codes, wherein the third code has functionality similar to the portion of code, and further characterize the portion of code with the third code by ascribing the characterization of the third code to the portion of code.

In another embodiment, the computer executable components can further comprise a format component, configured to receive the first code, wherein the first code is received having a first format and the first code is received prior to characterizing the first code with at least one of the codes in the collection of characterized codes, receive a requirement for format of the first code to be configured with a second format, and format the first code and the collection of characterized codes with the second format, wherein implementation of the second format prevents determination of the first code with the first format. In an embodiment, the first format can be a high-level programming language and the second format can be a low-level programming language.

In other embodiments, elements described in connection with the disclosed systems can be embodied in different forms such as computer-implemented methods, computer program products, or other forms. In an embodiment, a computer-implemented method can comprise automatically (a) receiving a first code, wherein the first code is configured to be implemented in a quantum computing system, (b) comparing the first code with a collection of characterized codes, (c) identifying a second code in the collection of characterized codes, wherein the second code has functionality similar to the first code, and/or (d) characterizing the first code with the second code by assigning the characterization of the second code to the first code. In an embodiment, the first code has previously not been implemented on the quantum computing system. In another embodiment, the second code can have an assigned attribute, the assigned attribute identifies at least one of content or functionality of the second code, and wherein characterizing the first code further comprises applying the assigned attribute of the second code as a first attribute of the first code.

In a further embodiment, the computer-implemented method can further comprise automatically representing each respective code in the collection of characterized codes with a respective vector, and further representing the first code with a first vector representation. The computer-implemented method can further comprise determining similarity between the first vector representation and each respective vector in the collection of characterized codes, and identifying the second code in the collection of characterized codes, wherein the second code has a vector value most similar to the vector value of the first vector representation.

In a further embodiment, the computer-implemented method can further comprise determining whether the vector value of the second vector has a similarity sufficiently similar to a value of the first vector representation, wherein determination is based on exceeding a similarity threshold, and in response a determination that the vector value of the second vector and the vector value of the first vector representation have a similarity exceeding the similarity threshold, characterizing the first vector with a characterization of the second code.

Another embodiment can further comprise a computer program product stored on a non-transitory computer-readable medium and comprising machine-executable instructions, wherein, in response to being executed, the machine-executable instructions cause a machine to perform operations, comprising automatically receiving a first computer code, wherein the first computer code is configured to be implemented in a quantum computing system, comparing the first computer code with a collection of characterized computer codes, identifying a second computer code in the collection of characterized computer codes, wherein the second computer code has functionality similar to the first computer code, and further characterizing the first computer code with the second computer code by assigning the characterization of the second computer code to the first computer code. In an embodiment, the first computer code has previously not been implemented on the quantum computing system. In another embodiment, the second computer code can have an assigned attribute, the assigned attribute identifies at least one of content or functionality of the second computer code, and wherein characterizing the first computer code further comprises applying the assigned attribute of the second computer code as a first attribute of the first computer code.

In a further embodiment, the operations can further comprise automatically representing each respective computer code in the collection of characterized computer codes with a respective vector; representing the first computer code with a first vector representation; determining similarity between the first vector representation and each respective vector in the collection of characterized computer codes; and further identifying the second computer code in the collection of characterized computer codes, wherein the second computer code has a vector value most similar to the vector value of the first vector representation.

DESCRIPTION OF THE DRAWINGS

One or more embodiments are described below in the Detailed Description section with reference to the following drawings.

DETAILED DESCRIPTION

Figure 1:
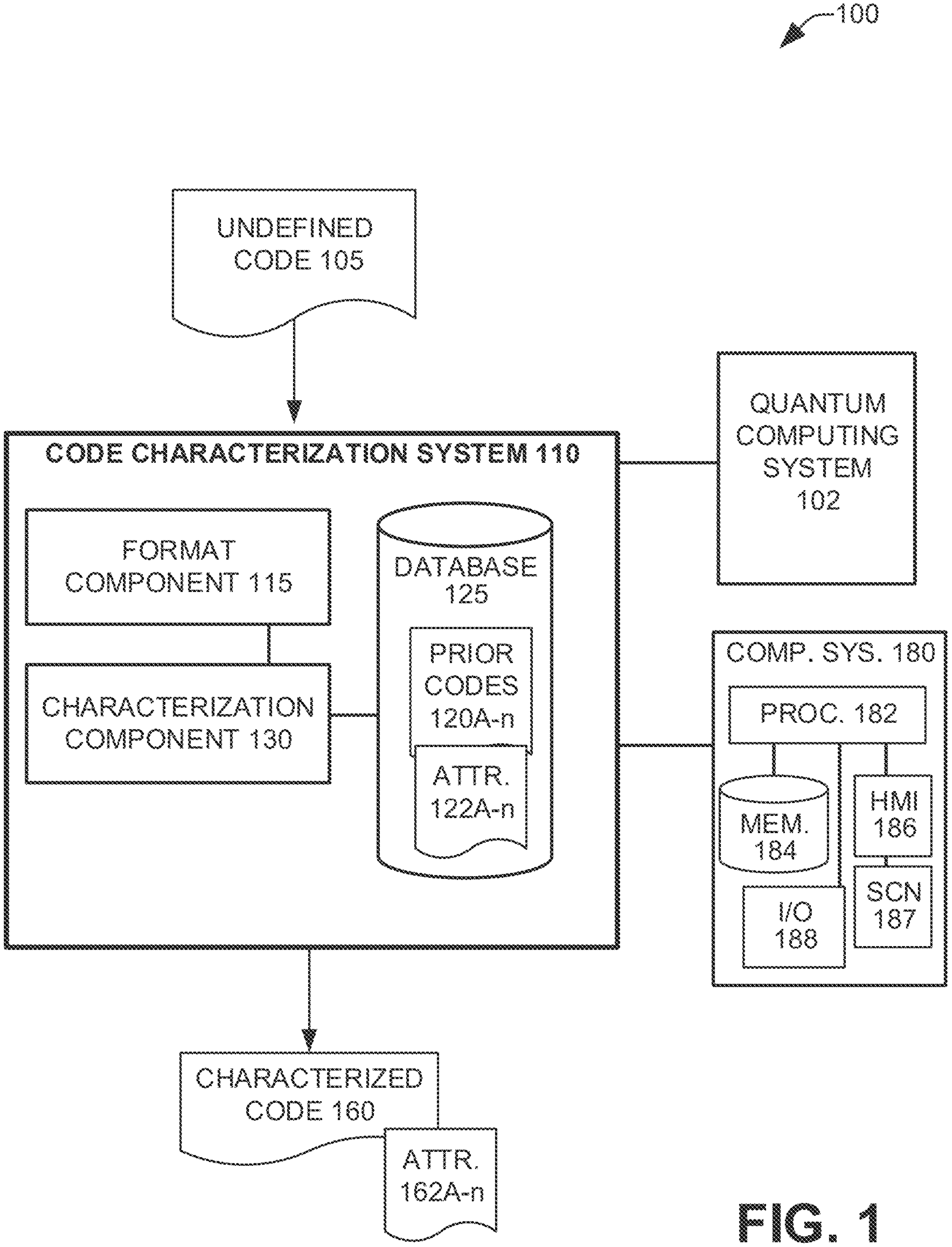
FIG. 1 illustrates a system that can be utilized to automatically characterize a computer program without having to execute the program, in accordance with one or more embodiments.

The following detailed description is merely illustrative and is not intended to limit embodiments and/or application or uses of embodiments. Furthermore, there is no intention to be bound by any expressed and/or implied information presented in any of the preceding Background section, Summary section, and/or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Ranges A-n and 1-i are utilized herein to indicate a respective plurality of devices, components, statements, attributes, etc., where n and i are any positive integer. The terms characterize, categorize, identify, determine, are used interchangeably herein.

A quantum computer program (QP) can comprise source code written in any language, specification, markup language, etc., providing instructions for operation of a quantum computing system. QP's can be written/executed at any language/programming level, from high-level languages that may be completely agnostic to the architecture of the quantum system on which the program is to run, through to low-level assembly languages which may be specific to/near to operation of the quantum computing system. In an aspect, a high-level language can comprise text, commands, parameters, terms, and suchlike, that are readily identifiable to a computer programmer having a degree of familiarity/competency with the high-level language, e.g., a programmer familiar with the PYTHON programming language. Further, a low-level language may be in a format such that a human computer programmer may not be able to readily discern functionality of the code, code structure, etc. In an aspect, the low-level language can be machine-code, a mathematical representation of the high-level language such as vectored statements, and suchlike.

A quantum computing system (also referred to herein as a quantum unit) can comprise of, in a non-limiting list, a quantum device, a quantum simulator, part of the hardware or software comprising or related to a quantum device, or any other system that computes/generates information using a specific hardware arrangement, and suchlike.

Execution of a QP on a quantum computing system provides insight to the function/intent of the QP with regard to equipment utilized by the QP, arrangement and execution of quantum logic gates, laser/microwave pulsing of qubits, pulse processing, etc. However, characterizing a QP without executing the QP on a quantum computing system can be complicated, and more so when the content of the QP is not known (e.g., no prior knowledge of the code statements present/defined in the QP). Knowledge of the variety of intents and applications of customer's QPs enables improvements in design and operation of the quantum computing system/stack and product, re-prioritizing tasks, etc. Characterizing a QP having a low-level language format, without executing the QP on a quantum computing system, may require application of artificial intelligence (AI) and machine learning (ML) technologies and techniques.

Per the various embodiments presented herein, systems, methods, and operations/procedures are presented to enable characterization of a QP without having to execute the QP (e.g., in a quantum computing system), and further, without having precise knowledge of the QP code and/or its content. In an embodiment, an uncharacterized QP (e.g., undefined code, first code) can be received, content parsed, and compared with previously executed and/or characterized QPs. One or more similarities can be determined between the newly received uncharacterized QP and the previously characterized QPs. Accordingly, based on one or more of the previously characterized QPs, knowledge of the newly received QP can be obtained without having to utilize quantum computing equipment, having such benefits as a reduction in client demand on the quantum computing equipment, as well as saving power/resources by not utilizing/operating the quantum computing equipment. Further, the various embodiments enable flexibility in the structure of the newly received QP, such that the newly received QP can be formatted/processed as an abstract form of an original code comprising the original QP which enables the various systems, etc., presented herein, to be executed on abstract code thereby enabling the customer's privacy/security requirement(s) to be respected, e.g., the customer does not want their original QP to be available to/stored by the owner of the quantum equipment. In an embodiment, the customer can provide the original QP in the form of high-level code, whereupon the quantum computing system operator can convert (e.g., via a code characterization system presented herein) the original code to an abstract code version, conduct further analysis (e.g., code characterization) on the abstracted code, while deleting the original code. In another embodiment, the original QP can be converted by the customer to a suitable abstract format prior to provision to the owner of the quantum computing system.

It is to be appreciated that while the various embodiments are directed towards characterization of an undefined code in its entirety, the various embodiments can be utilized to identify/segment an undefined code into a series/collection/group of subsets/portions of code, wherein each portion of code can have a defined/discernible function that can be characterized from the undefined code as a whole.

It is also to be appreciated that while the various embodiments presented herein relate to characterizing computer code in a quantum computing environment, the various embodiments are not so limited and can be applied to any operation/process for which undefined code of unknown content can be characterized by pre-existing/characterized codes. Accordingly, the undefined code does not have to be executed for one or more determinations to be made regarding the functionality of the undefined code and/or one or more system components required for implementation of the undefined code. The various embodiments herein are applicable to any environment implementing computer code to control operation of one or more devices, generate a value (e.g., determination of a parameter value), utilize in an information technology (IT) environment, and suchlike.

Turning now to the drawings, FIG. 1 illustrates a system 100 which can be utilized to automatically characterize a computer program without having to execute the computer program, in accordance with one or more embodiments. System 100 comprises a quantum computing system 102, and further, an undefined code/computer program 105 (also known as QP, undefined code, first code, original code), that when implemented, is configured/programmed to control operation of the quantum computing system 102. Undefined code 105 can be any QP representation/schema, such as a representation of a quantum circuit in a binary serialization format (e.g., QPY), user code in an assembly version such as quantum assembly language (e.g., QASM, QASM3), representation of a sequence of quantum logic gates, representation of execution of a pulsing sequence, and suchlike.

System 100 can further include a code characterization system 110 configured to characterize/categorize the undefined code 105, wherein, undefined code 105 can be received at the code characterization system 110 (e.g., via I/O component 188, as further described). In an example scenario of application of the various embodiments presented herein, the undefined code 105 can be unknown with regard to content, implementation, application, etc., of the undefined code 105, however, rather than executing the undefined code 105 (e.g., on quantum computing system 102, a simulator, and suchlike) and gaining knowledge regarding the content, etc., of undefined code 105, per the various embodiments presented herein, undefined code 105 can be characterized as a function of already existing knowledge regarding prior codes 120A-n, e.g., the prior codes 120A-n can be implemented on the quantum computing system 102, have already been characterized, knowledge of their content/structure is available/defined, and suchlike.

In an embodiment, e.g., to comply with a user requirement regarding data privacy, confidentiality, and suchlike, the characterization system 110 can include a format component 115, whereby the format component 115 can be configured to convert the undefined code 105 from an original/as-received first format to a second format, wherein the second format enables (a) masking of the original first format to preserve/comply with the data privacy requirement, (b) implementation of a format suitable (e.g., vectored) for characterization of the undefined code 105 based on comparison/similarity to other pre-existing codes, e.g., prior codes 120A-n. Accordingly, masking of the original first format can be configured to remove any information (e.g., digital fingerprints) that can associate a developer of the undefined code 105 with the undefined code 105. It is to be appreciated that the term "unrefined code" is used herein to refer to the undefined code 105 as it is received (e.g., at the code characterization system 110) in its original format (e.g., high-level language format or a low-level language format) and also the undefined code 105 after undergoing formatting by the format component 115 (e.g., to the low-level language format, vectored format, and suchlike).

As shown, system 100 can further include a database 125 comprising a collection of prior codes 120A-n, wherein the database 125 can be communicatively coupled to/incorporated within the characterization system 110. In an embodiment, attribute 122A-n of the respective prior codes 120A-n can already be known, wherein the term "attribute" is used herein to indicate knowledge regarding application of the prior codes 120A-n, a descriptor regarding functionality, characterization, categorization, system requirements, code structure, implementation of the code, and suchlike. In an embodiment, the prior codes 120A-n can include a first subset (e.g., prior codes 120A-H) of prior codes 120A-n which have been previously executed on one or more components included in a quantum computing system (e.g., quantum computing system 102, a simulator of quantum computing system 102, and suchlike). In another embodiment, the prior codes 120A-n can include a second subset (e.g., prior codes 120I-S) of prior codes 120A-n which may not have been previously executed on the quantum computing system, but sufficient knowledge exists regarding the coding/structure of the second subset of prior codes 120A-n such that the second subset of prior codes 120A-n can be utilized to categorize/gain understanding of the undefined code 105.

Code characterization system 110 can further include a characterization component 130. Characterization component 130 can be configured to compare the undefined code 105 (e.g., having the second, abstracted format) with the collection of prior codes 120A-n (e.g., also having the second, abstracted format) stored in database 125. As further described, in an embodiment, the characterization component 130 can be configured to determine a degree of similarity S between the undefined code 105 and the respective codes included in prior codes 120A-n. Based on a determination of S has an acceptable level of similarity (e.g., a similarity threshold value was met or exceeded) between the undefined code 105 and a second code 120A (e.g., in the prior codes 120A-n), known attribute 122A (e.g., in attributes 122A-n) assigned/ascribed/pertaining to the second code 120A can be applied/assigned by the characterization component 130 as content attribute 162A-n to characterize the undefined code 105 (e.g., as attribute 162A, whereby upon subsequent inclusion of undefined code 105 as characterized code 160 in the database 125 (e.g., characterized code 160 becomes prior code 120X), attribute 162A becomes attribute 122X of prior code 120X, and suchlike). Accordingly, per the foregoing, the various embodiments presented herein enable an undefined code 105 to be characterized as characterized code 160 with attribute 162A-n based on a second code 120A having known attribute 122A, and further, the categorization of the undefined code 105 with the second code 120A can be conducted without having to execute/implement the undefined code 105 on one or more components of the quantum computing system 102.

As further shown, the characterization system 110 can be communicatively coupled to/include a computer system 180. Computer system 180 can include a memory 184 that stores the respective computer executable components (e.g., format component 115, characterization component 130, customer format component 205, parse component 210, vector component 220, similarity component 230, recommendation component 250, process component 240, archive component 260, and suchlike, as further described herein) and further, a processor 182 configured to execute the computer executable components stored in the memory 184. Memory 184 can further be configured to include database 125, and thus store any of undefined code 105, characterized code 160, content attribute 162A-n, prior codes 120A-n, attribute 122A-n, thresholds 235A-n, processes 245A-n, notifications 252A-n, similarity indexes $S_{1-n}$, vectors Vx, and suchlike (as further described herein). The computer system 180 can further include a human machine interface (HMI) 186 (e.g., a display, a graphical-user interface (GUI)) which can be configured to present various information including the undefined code 105, characterized code 160, prior codes 120A-n, notifications 252A-n, and suchlike, (as further described) per the various embodiments presented herein. HMI 186 can include an interactive display/screen 187 to present the various information. Computer system 180 can further include an I/O component 188 to receive and/or transmit respectively an undefined code 105, characterized code 160, content attribute 162A-n, settings for thresholds 235A-n, customer requirements 207A-n, notifications 252A-n, and suchlike.

Figure 2:
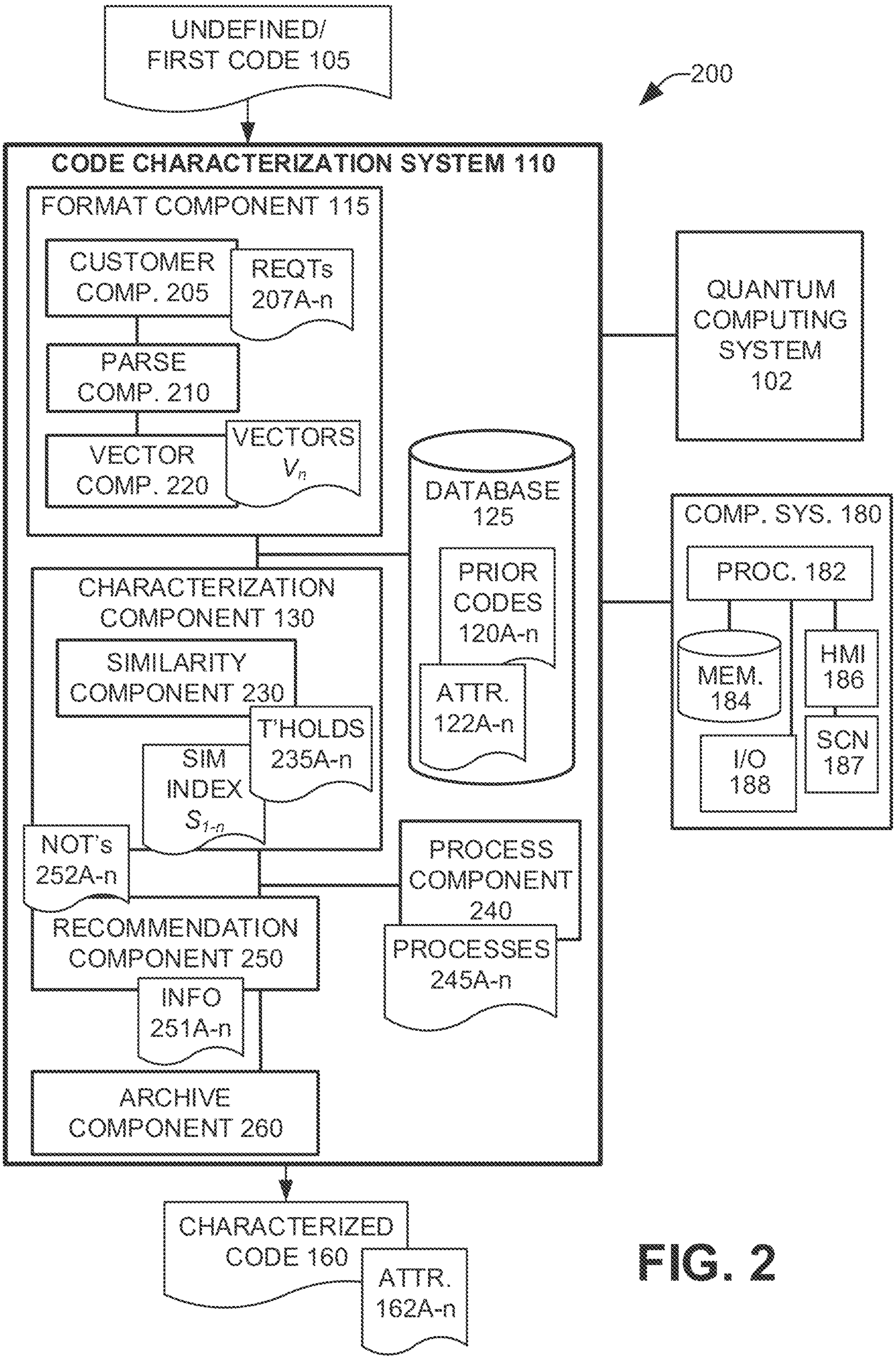
FIG. 2 is a schematic illustrating various components which can be utilized to characterize program code without executing the code, in accordance with one or more embodiments.

Turning to FIG. 2, system 200 further expands upon system 100 presented in FIG. 1. System 200 illustrates various components which can be utilized to characterize computer program code without executing the code. As shown, and as previously described, the code characterization system 110 can include a format component 115, database 125 configured to store/comprise prior codes 120A-n and attribute 122A-n, a characterization component 130, and a computer system 180, respectively communicatively coupled. In an embodiment, the format component 115 can be configured to format respective program codes, e.g., undefined code 105 and prior codes 120A-n, such that the codes can be expressed numerically, e.g., format component 115 converts text/numeric portions/content (e.g., high-level language) of the respective undefined code 105 and prior codes 120A-n into vectorized content (e.g., low-level language).

As shown in FIG. 2, the format component 115 can further include a customer format component 205, a parse component 210, and a vector component 220. The customer format component 205 can be configured to receive the undefined code 105 and format the code in accordance with a customer requirement 207A-n. As previously mentioned, a customer may implement a requirement 207A-n identifying a specific formatting that is to be applied to the undefined code 105 such that an original version of the undefined code 105 can be deleted, with the formatted undefined code 105 being further utilized for similarity analysis, etc. In the event, for example, of respective customers having their own specific formatting requirement(s), undefined code 105-1 received from a first customer can be formatted by customer format component 205 in accordance with a first formatting requirement 207A while undefined code 105-2 received from a second customer can be formatted by customer format component 205 in accordance with a second formatting requirement 207B, and suchlike. In an embodiment, the undefined code 105 can be formatted in accordance with the customer requirement 207A-n and subsequently vectorized, while in another embodiment, the vectorization technique applied by the vector component 220 can satisfy the customer requirement 207A-n.

The parse component 210 can be configured to analyze the undefined code 105 to determine/identify respective one or more portions of code included in the undefined code 105. It is to be appreciated that the term/phrase "portion of code" can describe a single line of code (e.g., a parameter and an associated value), through to multiple lines of program code. Hence, a block of code (e.g., undefined code 105 as received at the code characterization system 110) may comprise of distinct/identifiable portions/segments of code, wherein each portion of code may have a separate topic/focus of functionality but the portions of code combine to create an overall set of instructions, e.g., undefined code 105, for implementation on the quantum computing system 102. The parse component 210 can be configured to parse a main code (e.g., undefined code 105) to identify specific functions/functionality within the main code, such that the main code is broken down into portions of code extracted from the main code, as further described with reference to FIG. 4. Accordingly, the parse component 210 can be configured to identify distinct topics in undefined code 105, enabling the portions of codes to be analyzed with a high degree of granularity. Hence, rather than a single body of code, e.g., undefined code 105, being analyzed in its entirety for similarity with one or more prior codes 120A-n, the undefined code 105 can be parsed to identify the specific features/content within the body of the undefined code 105 for comparison with the prior codes 120A-n having a comparable level of granularity. Accordingly, the building blocks (portions of code) comprising the undefined code 105 can be characterized.

As mentioned, code characterization system 110 can include a characterization component 130, whereby characterization component 130 can be configured to analyze the undefined code 105 and the prior codes 120A-n to identify one or more prior codes 120A-n and undefined code 105 having a similarity ranging from a low degree of similarity (e.g., no match) through to a high degree of similarity (e.g., a match), and any intermediate degree of similarity therebetween. Format component 115 can include a vector component 220 configured to process/vectorize the respective undefined code 105 and prior codes 120A-n. As part of processing the respective portions of code in the codes 105 and 120A-n, each respective portion of code in each of the codes 105 and 120A-n can be defined/represented by the vector component 220 as a vector Vx, (e.g., where x represents undefined code 105, prior codes 120A-n, etc.) wherein the vector schema utilized can be any of a two-dimensional vector through to a multi-dimensional vector (e.g., a vector of many dimensions). Portions of code in both the undefined code 105 and the prior codes 120A-n having a similar vector representation can form clusters when represented on a similarity plot (e.g., as further described with reference to FIG. 4). Accordingly, those portions of code having a common topic/purpose will likely have a similar multi-dimensional representation, thereby forming a cluster.

As shown in FIG. 2, code characterization system 110 can further include a similarity component 230 configured to determine a degree of similarity S (e.g., a similarity index $S_{1-n}$) between the undefined code 105 and one or more prior codes 120A-n which have been previously characterized. In an example implementation, per FIG. 3, a similarity $S_{1-n}$ can be assessed based on similarity/dissimilarity as identified based on distance between respective values of vectors Vx. Similarity component 230 can be configured to function with one or more thresholds 215A-n. For example, a threshold 215A has to be exceeded for an acceptable degree of similarity S to be inferred between the undefined code 105 and a prior code 120A. In an embodiment, thresholds 215A-n can be established as a function of distance between two vectors, such that a distance $S_1$ indicates 95% similarity, a distance $S_2$ indicates 85% similarity, a distance $S_3$ indicates 75% similarity, a distance of $S_4$ or less indicates a similarity of less than 75% (with the similarity component 230 inferring that no similarity exists), and suchlike. It is to be appreciated that any suitable determination of similarity S can be utilized for the various embodiments presented herein.

The characterization component 130 can be further configured to generate and transmit a notification 252A-n indicating a status of characterizing the undefined code 105. For example, a notification 252A can provide information regarding undefined code 105, portions of code (e.g., code portions 105A-n, as further described) identified in undefined code 105, characterized code 160, one or more attributes 162A-n assigned to the characterized code 160, prior codes 120A-n identified as being similar/sufficient similarity to the undefined code 105/characterized code 160, any information regarding similarity thresholds 235A-n being met/not met, whether it was not possible to characterize an undefined code 105 with an acceptable degree of certainty of similarity, respective vector values Vx for the undefined code 105 and prior codes 120A-n, determined degrees of similarity $S_{1-n}$, information regarding formatting of the undefined code 105 and prior codes 120A-n, any customer requirements 207A-n (e.g., complied with), any recommendations generated by a recommendation component (e.g., recommendation component 250, as further described) for utilization on the quantum computing system 102, any recommendations regarding improving the undefined code 105 with an existing prior code 120A-n (as further described), what AI/ML processing (e.g., processes 245A-n) was applied to characterize the undefined code 105, and suchlike. The notification 252A-n can be made available in any suitable manner, e.g., presented on a screen 187 of HMI 186, transmitted to an external entity (e.g., the owner of the undefined code 105, operator of quantum computing system 102, and suchlike) via the I/O 188.

The code characterization system 110 can further include a recommendation component 250. In an embodiment, the recommendation component 250 can be configured with information/data 251A-n pertaining to one or more system components included in the quantum computing system 102 (e.g., system components presented in FIG. 10, as further described). Hence, the recommendation component 250 can be configured to extend knowledge regarding classifying the undefined code 105, but further determine whether the architecture, e.g., quantum computing system 102, can support implementation of the undefined code 105.

In an embodiment, an intent of the undefined code 105 can be determined by the recommendation component 250, and based thereon, a replacement code can be provided by the recommendation component 250, wherein the replacement code can have the same functionality as the undefined code 105 but achieves the functionality in a more efficient manner. In an embodiment, the replacement code can be a prior code 120A-n that most closely matches the functionality of the undefined code 105. The recommendation component 250 can be configured to compile and generate a notification 252A-n for transmission to the entity generating undefined code 105, such that the entity can utilize the replacement code, e.g., 120R, in a subsequent version of their undefined code 105. In an embodiment, the replacement code 120R can be configured to perform a particular function on the quantum computing system 102, such that the recommendation component 250 can identify a goal/endpoint of the undefined code 105, or portion 105A-n of the undefined code 105, identify that quantum computing system 102 can achieve the goal in a more efficient/improved manner, identify the replacement code 120R that better achieves the goal, and replace the undefined code 105, or portion 105A-n of undefined code 105, with the replacement code 120R. In another embodiment, the recommendation component 250 can identify one or more components included in the quantum computing system 102, wherein the one or more components can be utilized to physically implement the undefined code 105 at a subsequent time. In a further embodiment, the recommendation component 250 can be configured to identify respective components currently included in the quantum computing system 120 and further identify one or more components required to implement the undefined code 105. In the event of a component required to implement the undefined code 105 is not currently present/included in the quantum computing system 102, the recommendation component 250 can be configured to identify the required component (e.g., a modified qubit array) and further generate/transmit a notification 252A-n identifying the required component. The notification 252A-n can be received by any of the operator of the quantum computing system 102, the client providing undefined code 105 to the code characterization system 110, and suchlike, for further implementation of the required component, as required.

The code characterization system 110 can further include an archive component 260 configured to archive the characterized code 160 and attribute 162A-n in database 125, such that the characterized code 160 and attribute 162A-n are added to/supplement the prior codes 120A-n and attributes 122A-n. Accordingly, the knowledge gained by characterizing the undefined code 105 as characterized code 160 can be utilized to characterize a future undefined code subsequently received at the code characterization system 110. In another embodiment, in the event of an undefined code 105 is unable to be characterized with a sufficient degree of confidence (e.g., a particular threshold 235A-n of similarity was not met), the undefined code 105 can be archived and as the number of prior codes 120A-n in database 125 increases over time, the undefined code 105 can be re-evaluated based on the subsequent knowledge compiled in the prior codes 120A-n.

The code characterization system 110 can further comprise a process component 270 and processes 245A-n. It is to be appreciated that processes 245A-n can comprise any AI/ML model/technology/technique/architecture utilized to identify one or more prior codes 120A-n having content similar to the content of the undefined code 105. The process component 270 can be utilized to implement processes 245A-n in conjunction with any of the other components included in the code characterization system 110, e.g., the format component 115, the customer format component 205, the parse component 210, the vector component 220, characterization component 130, the similarity component 230, the recommendation component 250, archive component 260, and suchlike.

It is to be appreciated that the various processes 245A-n and operations presented herein are simply examples of respective AI and ML operations and techniques, and any suitable technology can be utilized in accordance with the various embodiments presented herein. Processes 245A-n can be based on application of terms, codes, statements, etc., in the undefined code 105 and prior codes 120A-n, whereby processes 245A-n can include a vectoring technique such as bag of words (BOW) text vectors, and further, any suitable vectoring technology can be utilized, e.g., Euclidean distance, cosine similarity, etc. Other suitable AI/ML technologies that can be applied can include, in a non-limiting list, any of vector representation via term frequency-inverse document frequency (tf-idf) capturing term/token frequency in the undefined code 105 versus prior codes 120A-n, neural network embedding layer vector representation of terms/categories (e.g., common terms having different tense), bidirectional and auto-regressive transformer (BART) model architecture, a bidirectional encoder representation from transformers (BERT) model, long short term memory network (LSTM) operation(s), a sentence state LSTM (S-LSTM), a deep learning algorithm, a sequential neural network, a sequential neural network that enables persistent information, a recurrent neural network (RNN), a convolutional neural network (CNN), a neural network, capsule network, a machine learning algorithm, a natural language processing (NLP) technique, sentiment analysis, bidirectional LSTM (BiLSTM), stacked BiLSTM, and suchlike. Accordingly, in an embodiment, implementation of the format component 115, parse component 210, the vector component 220, process component 240, processes 245A-n, the characterization component 130, similarity component 230, and suchlike, enables NLP (e.g., utilizing vectors) to be implemented on the undefined code 105.

Language models, LSTMs, BARTs, etc., can be formed with a neural network that is highly complex, for example, comprising billions of weighted parameters. Training of the language models, etc., can be conducted, e.g., by process component 240, with datasets, whereby the datasets can be formed using any suitable technology, such as prior codes 120A-n, and suchlike. The prior codes 120A-n can be available from many sources, e.g., collected from prior code interactions with one or more customers/clients of the quantum computing system 102, provided by a client, provided by a third party (e.g., manufacturer/vendor of a component included in the quantum computing system 102), programmed by an engineer associated with operation of the quantum computing system 102, and suchlike. Further, undefined code 105 and prior codes 120A-n can comprise text, alphanumerics, numbers, single words, phrases, short statements, long statements, expressions, syntax, source code statements, machine code, etc. Fine-tuning of a LM can comprise application of a prior code 120A-n to the LM, the LM is correspondingly adjusted by application of the prior code 120A-n, such that, for example, weightings in the LM are adjusted by application of the prior code 120A-n.

Figure 3:
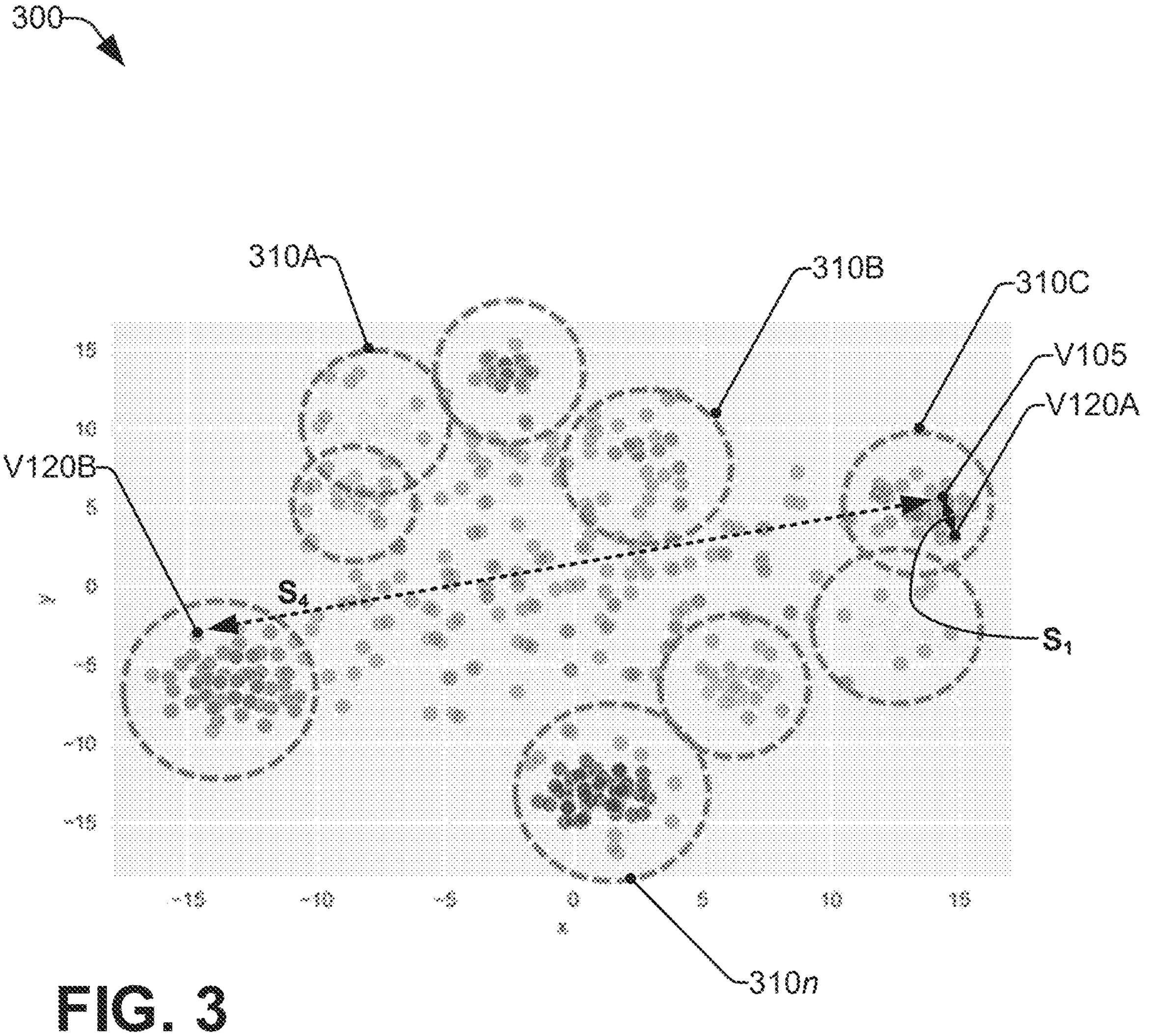
FIG. 3 presents a plot illustrating clustering of respective vectors generated by vectorizing an undefined code and prior codes, in accordance with one or more embodiments.

As mentioned, portions of code in both the undefined code 105 and the prior codes 120A-n having a similar vector representation can form clusters when represented on a similarity plot. FIG. 3, plot 300 illustrates clustering of respective vectors generated by vectorizing an undefined code and prior codes. Plot 300 represents a two-dimensional plot of various vectors Vx and potential cluster formation, whereby vectors V120A-n are mathematical representations of the prior codes 120A-n, and vector V105 is a mathematical representation of the undefined code 105. As shown in FIG. 3, the distance, e.g., similarity distance $S_n$, between respective vector values Vx indicates the degree of similarity between the codes 105 and 120A-n derived from the vectors V105 and V120A. Per the example schematic presented in FIG. 3, a similarity distance $S_1$ can be determined (e.g., by similarity component 230) between the value of vector V105 and vector V120A, and further, a similarity distance $S_4$ can be determined between the value of vector V105 and vector V120B. Hence, given that similarity distance $S_1$ is less than similarity distance $S_4$, an inference can be made (e.g., by similarity component 230) that the content of undefined code 105 has a high degree of similarity with the content of prior code 120A, while the content of undefined code 105 has a low degree of similarity with the content of prior code 120B. As previously mentioned, the degree of similarity between undefined code 105 and prior code 120A can be determined based on a threshold 235A reflecting a proximity of a first vector generated from undefined code 105 and a second vector generated from a prior code 120A-n.

The similarity component 230 can be configured to determine similarity based on text, semantics, textual summarization, etc., between various items of interest (e.g., pairings of undefined code 105 and respective prior codes 120A-n). To enable subsequent review of the undefined code 105 and prior codes 120A-n, clusters of vectors can be analyzed. Any suitable clustering technique can be utilized by the similarity component 230, e.g., vector quantization (VQ). In an embodiment, similarity component 230 can cluster the vectors V120A-n and V105 based on their respective vector representation. For example, a k-means clustering algorithm, such as a radius-based k-means clustering algorithm, can be applied by the similarity component 230 to cluster the vectors V120A-n and V105 into clusters comprising vectors that have the same, similar, or approximate value. Hence vectors in cluster 310A represent codes (e.g., codes 105 and 120A-n) having similar functionality/content, and similarly clusters 310B, 310C, and 310*n* comprise codes having respectively similar functionality/content.

Figure 4:
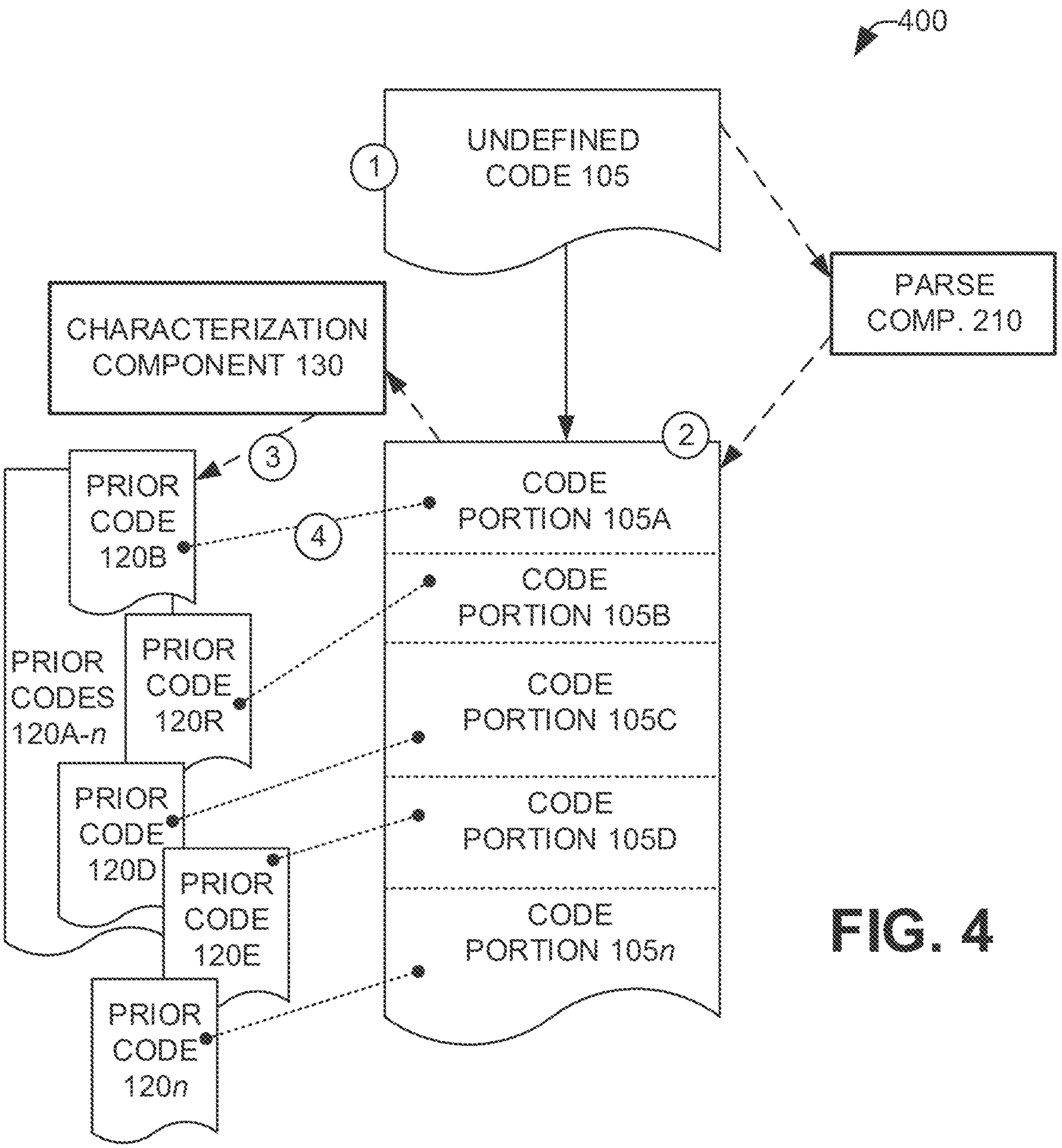
FIG. 4 presents a schematic illustrating separation of an undefined code into respective code portions and further identification of prior codes similar to the respective code portions, in accordance with one or more embodiments.

FIG. 4 presents system 400 illustrating separation of an undefined code into respective code portions and further identification of prior codes similar to the respective code portions. As previously mentioned, a parse component 210 can be configured to parse an undefined code 105 into respective portions of code wherein each portion of code can have particular functionality. Accordingly, as shown in FIG. 4, the parse component 210 has been implemented on the undefined code 105 such that distinct portions of code 105A, 105B, 105C, 105D, and 105*n* have been identified, wherein each portion of code 105A-n has a definable/observed function. As further shown in FIG. 4, based on vectorizing (e.g., by vector component 220) the respective code portions 105A-n and prior codes 120A-n, and further performing similarity analysis (e.g., by similarity component 230) on the respective code portions 105A-n and prior codes 120A-n, a series of prior codes 120A-n being similar to code portions 105A-n have been identified, e.g., prior code 120B is determined (e.g., by characterization component 130) to be similar to code portion 105A of undefined code 105, prior code 120R is determined to be similar to code portion 105B, prior code 120D is determined to be similar to code portion 105C, prior code 120E is determined to be similar to code portion 105D, prior code 120*n* is determined to be similar to code portion 105*n*, and suchlike.

Hence, stepping through an example sequence of acts/steps presented in FIG. 4:

At step 400-1: undefined code 105 is received at the code characterization system 110.

At step 400-2: parse component 210 is applied to the undefined code 105, with respective code portions 105A-n identified in the undefined code 105.

At step 400-3: code portions 105A-n are respectively vectorized by vector component 220, while prior codes 120A-n have been previously vectorized.

At step 400-4: similarity assessment is performed (e.g., by similarity component 230) on the respective code portions 105A-n against prior codes 120A-n, such that code portions 105A-n are individually paired (e.g., by characterization component 130) with prior codes 120A-n having a defined degree of similarity.

Figure 5:
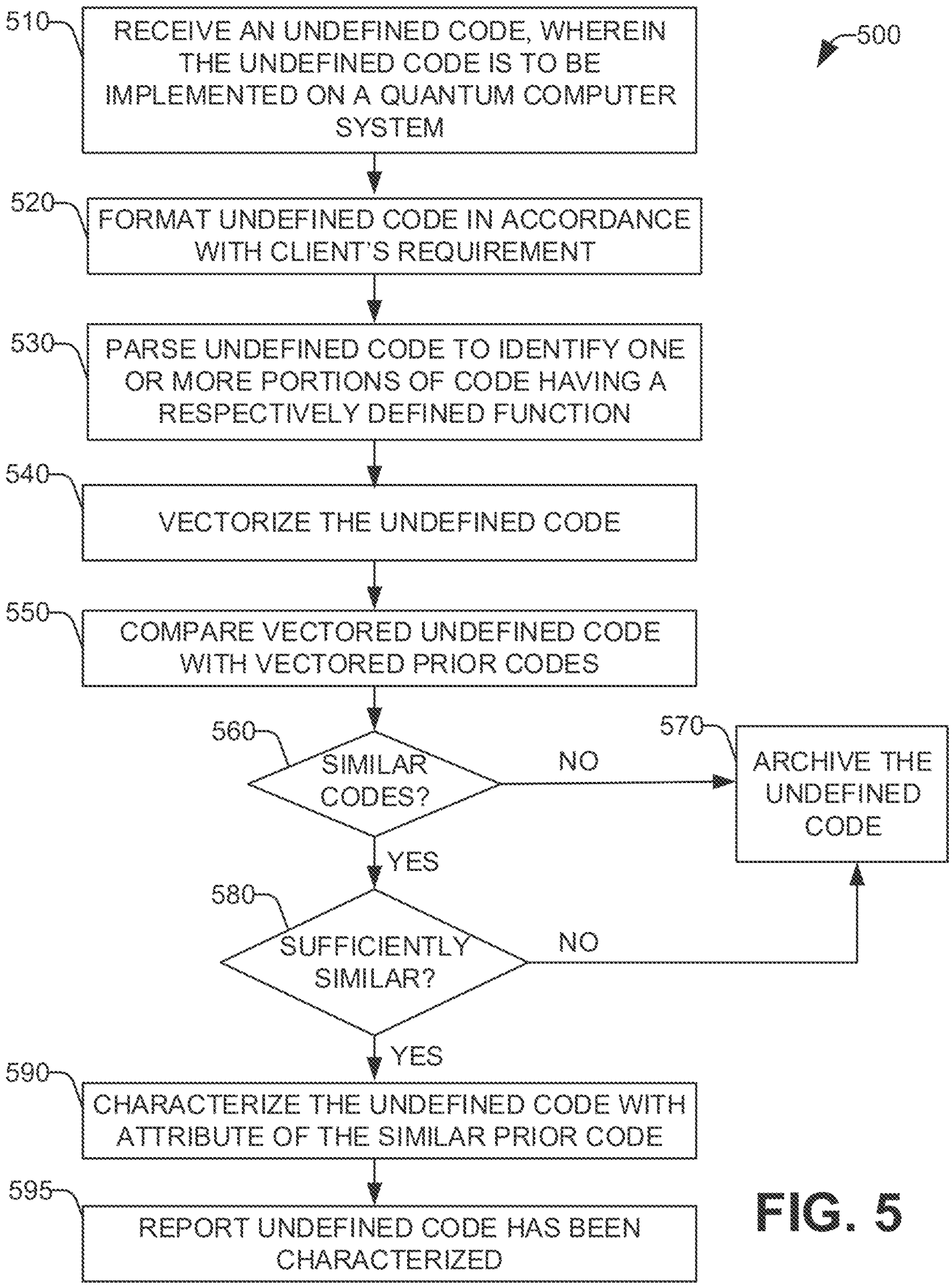
FIG. 5 illustrates a computer-implemented methodology for utilizing knowledge derived from one or more previously characterized codes to characterize a computer code that has not been previously executed on a quantum computing system, according to one or more embodiments.

FIG. 5, methodology 500, illustrates a computer-implemented methodology for utilizing knowledge derived from one or more previously characterized codes to characterize a computer code that has not been previously executed on a quantum computing system, according to one or more embodiments.

At 510, an undefined code (e.g., undefined code 105, a first code) can be received at a code characterization system (e.g., code characterization system 110), wherein the undefined code has not been previously characterized, and furthermore, the undefined code has not been implemented on a quantum computing system (e.g., quantum computing system 102). Accordingly, knowledge of the content, functionality, etc., of the undefined code may be currently limited.

At 520, in an embodiment, the undefined code can be received in conjunction with a requirement (e.g., requirement 207A) that the undefined code remains secure. A formatting component (e.g., format component 115) can be configured to format the undefined code such that it is not possible to reverse-engineer the undefined code having its original format (e.g., a first format of the undefined code when originally received at the code characterization system) from the newly formatted undefined code (e.g., a second format applied to the undefined code by the format component 115). In an embodiment, the first format can comprise high-level language/code (e.g., text-based), while the second format can comprise low-level code (e.g., mathematical representation, vector-based representation, etc.). In an embodiment, the vectorization of the undefined code (as mentioned in step 540 below) can function as the formatting to be applied in accordance with the requirement that the undefined code remains secure.

At 530, the undefined code (e.g., in the first format or the second format, depending upon when the parsing operation is performed) can be parsed by a parse component (e.g., parse component 210), wherein the parse component is configured to identify one or more portions of code in the undefined code, wherein the one or more portions of code can have distinct functionality. In an embodiment, the parsing operation can be omitted, with the undefined code processed in its entirety rather than as constituent portions of code.

At 540, the undefined code can be processed to enable the undefined code to be characterized based on similarity to comparable, prior/pre-existing code (e.g., prior codes 120A-n). In an embodiment, the pre-existing code can be previously characterized and compiled in a database (e.g., database 125). Processing of the undefined code can utilize any suitable technology. In an embodiment, a vector component (e.g., vector component 220) can be utilized to represent the functionality, etc., of undefined code with vector representation Vx (e.g., vector V105).

At 550, the undefined code (having vector representation V105) can be compared with the pre-existing code (having vector representation V120A-n) to determine similarity (per similarity index $S_{1-n}$) between the undefined code and any of the pre-existing codes. A similarity component (e.g., similarity component 230) can be configured to perform the similarity analysis, whereby similarity can be determined based on distance between a first vector (e.g., vector V105) representing the undefined code and a second vector (e.g., vector V120A) representing a first pre-existing code in the collection of pre-existing codes (e.g., collection of prior codes 120A-n).

At 560, in response to a determination (e.g., by the characterization component 130 and/or by the similarity component 230) of NO, there are no pre-existing codes that are similar to the undefined code, methodology 500 can advance to step 570, whereupon the undefined code can be archived (e.g., by an archive component 260). The archived undefined code can be subsequently re-assessed for similarity against any further codes that are subsequently characterized by the code characterization system.

At 560, in the event of YES, the undefined code is determined to be similar one or more pre-existing codes, methodology 500 can advance to step 580. At 580, the degree of similarity between the undefined code and the one or more pre-existing codes can be assessed by a characterization component (e.g., characterization component 130), wherein the characterization component can utilize similarity thresholds (e.g., similarity thresholds 235A-n) to determine whether a similarity (e.g., similarity $S_n$) determined between a pre-existing code has sufficient similarity to the undefined code to enable characterizing the undefined code with the identified pre-existing code. In the event of a determination of NO, insufficient similarity exists (e.g., $S_n$<threshold 235A) between the undefined code and the one or more identified pre-existing codes, e.g., a required threshold of similarity was not met, methodology 500 can return to step 570, whereupon the undefined code can be archived, as previously mentioned.

At 580, in the event of YES, a threshold of similarity was met (e.g., $S_n$≥threshold 235A), methodology 500 can advance to step 590, whereupon the characterization component can be further configured to apply an attribute (e.g., attributes 122A-n) previously assigned to the similar pre-existing code as an attribute (e.g., attribute 162A-n) of the undefined code, such that the undefined code becomes a characterized code (e.g., characterized code 160) as a function of the assigned attribute (e.g., attribute 162A of characterized code 160 is generated from attribute 122A of prior code 120A).

At 595, processing of the undefined code as the characterized code can be reported, whereby the characterization component can be further configured to generate a notification (e.g., notification 252A-n) providing information regarding any of a status of characterizing the undefined code, portions of code identified in undefined code, characterized code, one or more attributes assigned to the characterized code, prior codes identified as being similar/sufficient similarity to the undefined code/characterized code, any information regarding similarity thresholds being met/not met, whether it was not possible to characterize an undefined code with an acceptable degree of certainty of similarity, respective vector values Vx for the undefined code and prior codes, determined degrees of similarity $S_{1-n}$, information regarding formatting of the undefined code and prior codes, any customer requirements, any recommendations generated by a recommendation component for utilization on the quantum computing system, any recommendations regarding improving the undefined code with an existing prior code, what AI/ML processing (e.g., processes 245A-n) was applied to characterize the undefined code, and suchlike.

Figure 6:
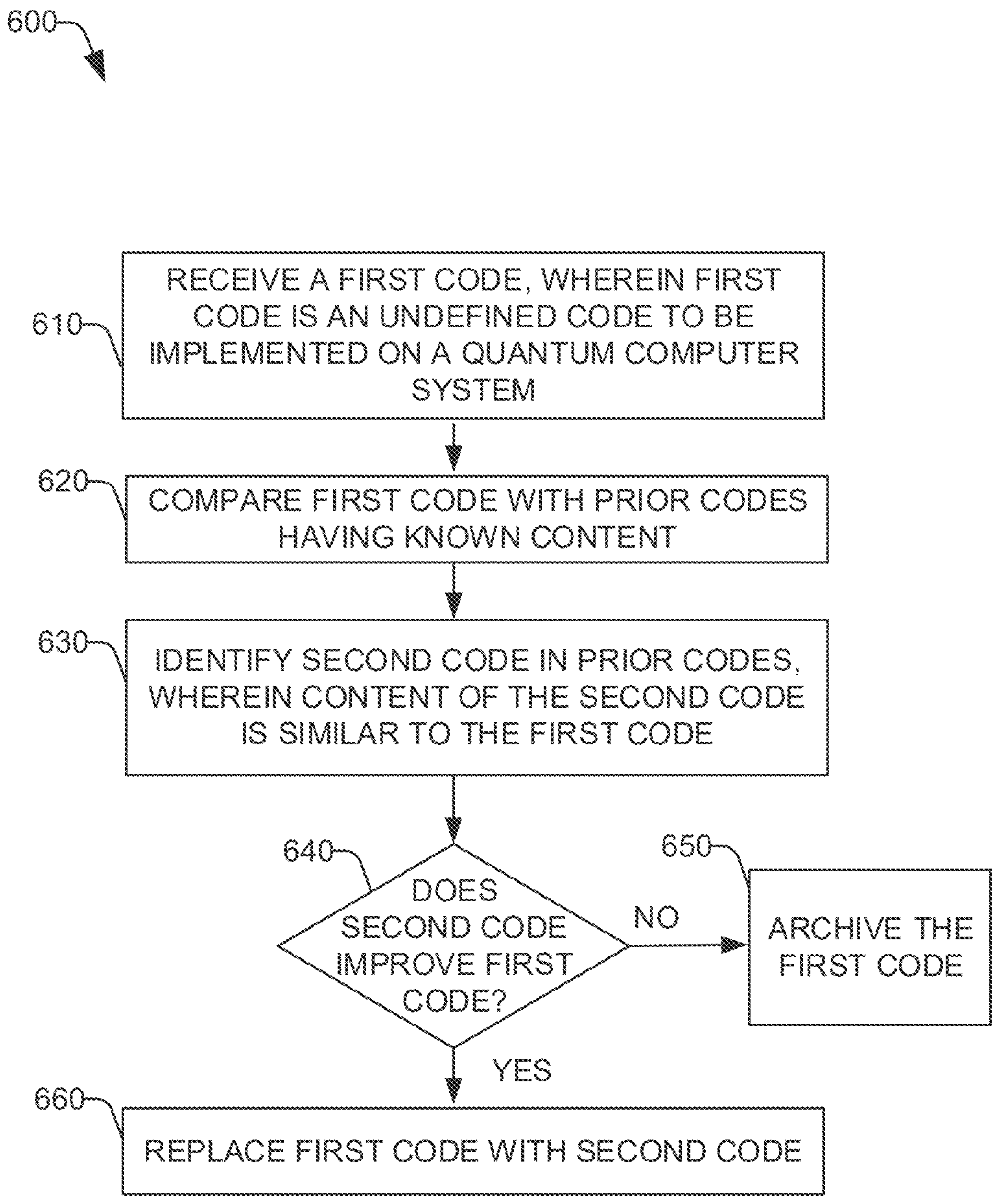
FIG. 6 illustrates a computer-implemented methodology for potentially improving an undefined code based on a pre-existing code characterized for implementation on a quantum computing system, according to one or more embodiments.

FIG. 6, methodology 600, illustrates a computer-implemented methodology for potentially improving an undefined code based on a pre-existing code characterized for implementation on a quantum computing system, according to one or more embodiments.

At 610, a first code (e.g., undefined code 105) is received at a code characterization system (e.g., code characterization system 110), wherein the first code includes unknown content to be characterized. The first code has been configured to be implemented on a quantum computing system (e.g., quantum computing system 102).

At 620, as part of a characterization process (e.g., by format component 115, characterization component 130, and suchlike), the first code can be compared with a collection of prior codes (e.g., prior codes 120A-n), wherein the prior codes have been previously characterized and one or more attributes (e.g., attributes 122A-n) respectively identified for each of the prior codes. As previously mentioned, the first code and prior codes can be in a format in compliance with a customer's privacy requirement, and further vectorized to enable similarity assessment to be conducted. Further, the first code and the prior codes can be portions of a larger code, e.g., first code has been extracted from a larger code that was originally submitted to the code characterization system.

At 630, a second code, in the collection of prior codes, is identified as being sufficiently similar to the first code, e.g., content of the second code is comparable to first code with regard to functionality, coding, etc.

At 640, a determination can be made regarding whether the second code improves implementation of the first code. For example, are the second code and the first code programmed to achieve the same result? (e.g., operation of a sequence of quantum gates, and suchlike), however, the second code achieves the result in a more efficient manner. In response to a determination (e.g., by recommendation component 250) that NO, the second code does not improve the first code, methodology 600 can advance to step 650, whereupon the first code in its current form can be stored in combination with the assigned attribute (e.g., in database 125).

At 640, in response to a determination (e.g., by recommendation component 250) that YES, the second code is better configured to achieve the result, the first code can be replaced by/supplemented by the second code, whereupon the amended first code can be stored (e.g., in database 125).

Figure 7:
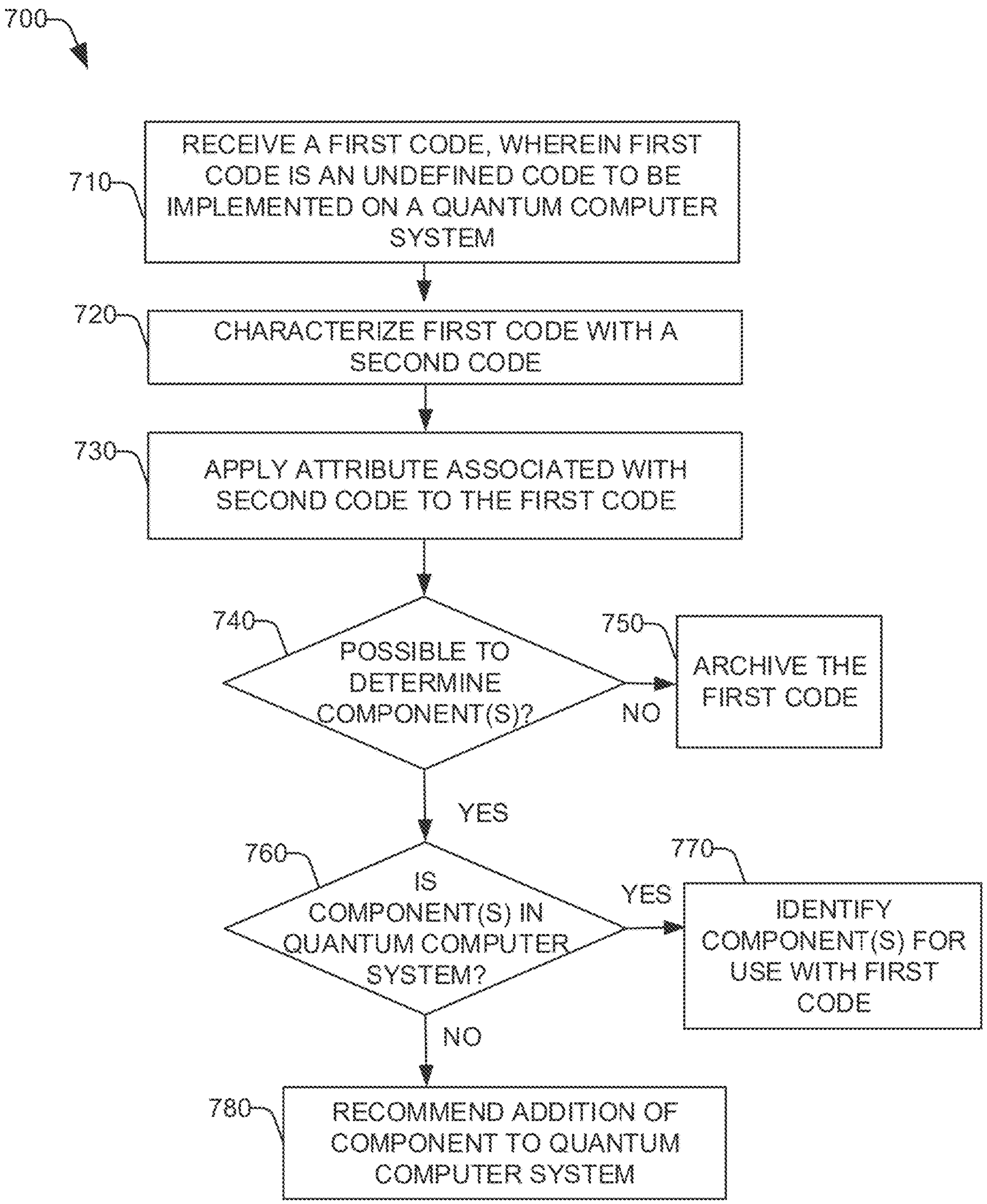
FIG. 7 illustrates a computer-implemented methodology for identifying one or more system components required to implement an undefined code based on a pre-existing code characterized for implementation on a quantum computing system, according to one or more embodiments.

FIG. 7, methodology 700, illustrates a computer-implemented methodology for identifying one or more system components required to implement an undefined code based on a pre-existing code characterized for implementation on a quantum computing system, according to one or more embodiments.

At 710, a first code (e.g., undefined code 105) is received at a code characterization system (e.g., code characterization system 110), wherein the first code includes unknown content to be characterized. The first code has been configured to be implemented on a quantum computing system (e.g., quantum computing system 102), however, at the time of the first code being submitted to the code characterization system, respective components in the quantum computing system required to implement/execute the first code are not known.

At 720, as previously described, the first code can be characterized by a second code (e.g., a prior code 120A-n), whereby the first code and the second code are determined to be sufficiently similar regarding content, functionality, etc.

At 730, an attribute (e.g., attribute 122A) can be previously assigned to the second code (e.g., prior code 120A), wherein the attribute identifies content, functionality, of the second code (e.g., based on knowledge acquired from previously executing the prior code 120A). In an embodiment, as part of characterizing the second code, the attribute of second code can be assigned (e.g., by characterization component 130) to the first code (e.g., as attribute 162A).

At 740, as a function of the attribute assigned to the first code, it may be possible to determine (e.g., by recommendation component 250) one or more system components in a quantum computing system required to execute the first code. In response to a determination that NO, the one or more system components cannot be determined from the attribute (or other knowledge obtained regarding the first code), methodology 700 can advance to step 750, whereupon the first code and assigned attribute can be stored (e.g., in database 125).

At 740, in response to YES, the one or more system components can be determined, e.g., from the attribute, methodology 700 can advance to step 760.

At 760, a further determination (e.g., by recommendation component 250) can be made regarding whether the one or more components required to implement the first code are present in the quantum computing system (e.g., quantum computing system 102) on which the first code is to execute. In the event of a determination by the recommendation component that, YES, the one or more components required to implement the first code are present in the quantum computing system, methodology 700 can advance to step 770, whereupon the one or more components can be identified, with the attribute (e.g., attribute 162A assigned to the first code) updated, e.g., by the recommendation component, to identify the one or more components in the quantum computing system.

At 760, in response to a determination (e.g., by recommendation component 250) that NO, the one or more components required to implement the first code are not present in the quantum computing system, methodology 700 can advance to step 780 whereupon the recommendation component can be configured to identify the required one or more components and further generate and transmit a notification (e.g., notification 252A-n) identifying the required one or more components that are not present, and should be acquired if first code is to be implemented.

Figure 8:
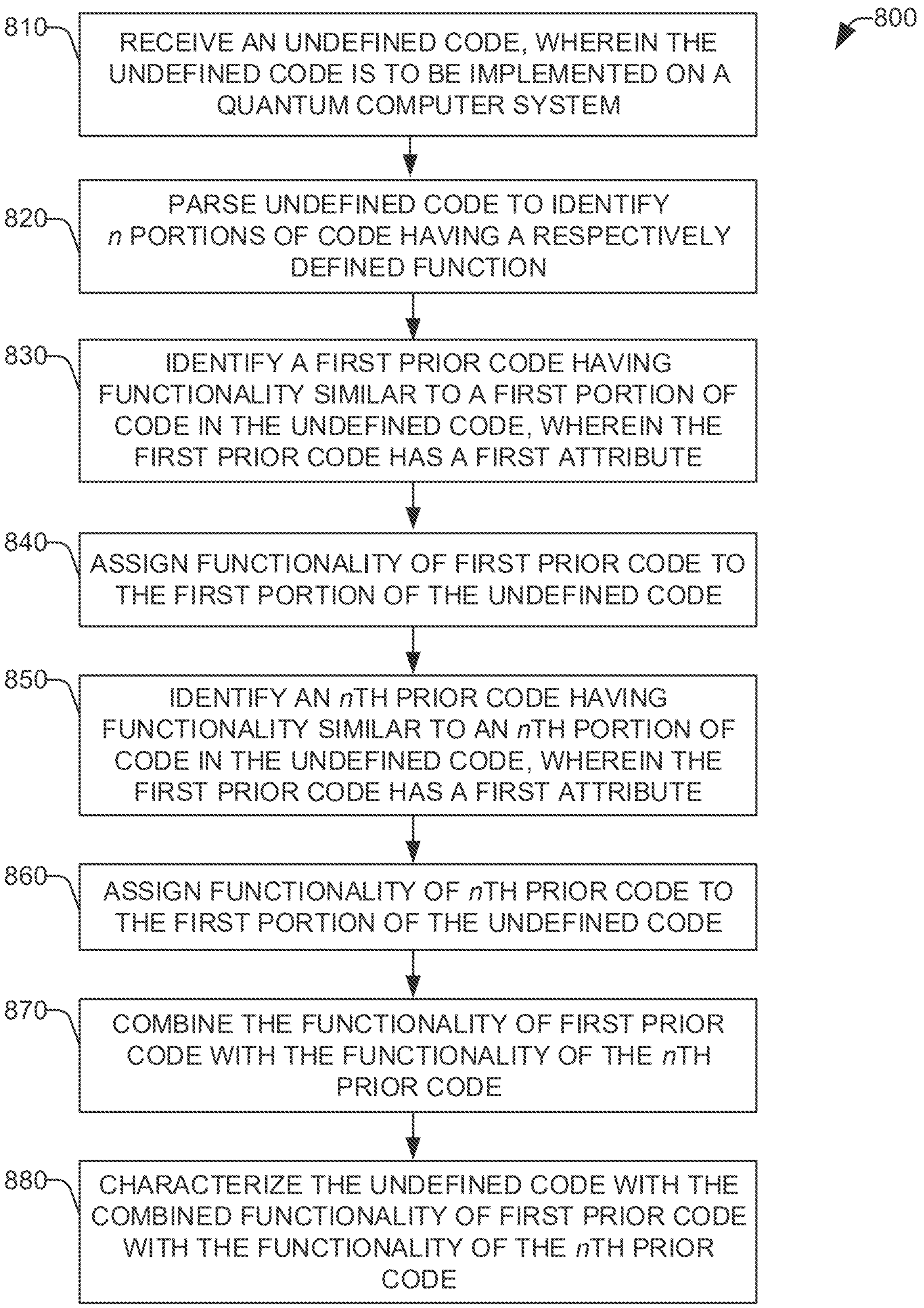
FIG. 8 illustrates a computer-implemented methodology for identifying portions of code within a larger body of code and identifying prior codes pertaining to the portions of code, according to one or more embodiments.

FIG. 8, methodology 800, illustrates a computer-implemented methodology for identifying portions of code within a larger body of code and identifying prior codes pertaining to the portions of code, according to one or more embodiments.

At 810, an undefined code (e.g., undefined code 105, first code) is received at a code characterization system (e.g., code characterization system 110), wherein the undefined code includes unknown content to be characterized. The undefined code has been configured to be implemented on a quantum computing system (e.g., quantum computing system 102), however, at the time of the undefined code being submitted to the code characterization system, respective components in the quantum computing system required to implement/execute the first code are not known.

At 820, the undefined code can be parsed by a parse component (e.g., parse component 210), wherein the parse component can be configured to identify respective portions of code (e.g., n-portions of code, code portions 105A-n) within the undefined code. In an embodiment, the portions of code can be considered to be subsets of code combining to form the undefined code.

At 830, the respective portions of code can be analyzed to identify prior codes (e.g., prior codes 120A-n) being similar to the respective portion of code (as previously described). Hence, a first prior code (e.g., prior code 120A) can be identified (e.g., by similarity component 230) having functionality, etc., that is similar to the first portion of code.

At 840, a characterization component (e.g., characterization component 130) can be configured to assign an attribute (e.g., attribute 122A) associated with the first prior code to the first portion of code (e.g., attribute 122A becomes an attribute 162A of code portion 105A).

At 850, an nth prior code (e.g., prior code 120*n*) can be identified (e.g., by similarity component 230) having functionality, etc., that is similar to an nth portion of code (e.g., code portion 105*n*).

At 860, the characterization component can be further configured to assign an attribute (e.g., attribute 122*n*) associated with the nth prior code to the nth portion of code (e.g., attribute 122*n* becomes an attribute 162*n* of code portion 105*n*). Accordingly, per steps 830-860, the respective code portions (e.g., code portions 105A-n) can be identified, with similar prior codes (e.g., prior codes 120A-n) and respective attributes (e.g., attributes 122A-n) identified and assigned thereto (e.g., as attributes 162A-n).

At 870, the characterization component can be further configured to combine the respective attributes (e.g., attributes 162A-n) identified for the respective code portions (e.g., code portions 105A-n) to create an omnibus attribute.

At 880, the characterization component can be further configured to assign the omnibus attribute to the undefined code, such that the undefined code is characterized as a function of the respective code portions (e.g., code portions 105A-n) included in the unrefined code and the attributes (e.g., attributes 162A-n) identified and assigned to the respective code portions. Accordingly, undefined code has been characterized as a function of an amalgamation of portions of code comprising the undefined code.

Per the various embodiments presented herein, various components included in the code characterization system 110, format component 115, customer format component 205, parse component 210, vector component 220, characterization component 130, similarity component 230, recommendation component 250, archive component 260, process component 240, and suchlike, can include AI and ML and reasoning techniques and technologies (e.g., processes 245A-n) that employ probabilistic and/or statistical-based analysis to prognose or infer an action that a user desires to be automatically performed, as previously mentioned. The various embodiments presented herein can utilize various AI and ML-based schemes for carrying out various aspects thereof. For example, a process 245A (e.g., by characterization component 130 in conjunction with similarity component 230) for characterizing an undefined code 105 with one or more prior codes 120A-n, a process 245B (e.g., by recommendation component 250) to determine codes and equipment to implement the undefined code 105, and suchlike, as previously mentioned herein, can be facilitated via an automatic classifier system and process.

A classifier is a function that maps an input attribute vector, x=(x1, x2, x3, x4, xn), to a class label class(x). The classifier can also output a confidence that the input belongs to a class, that is, f(x)=confidence(class(x)). Such classification can employ a probabilistic and/or statistical-based analysis (e.g., factoring into the analysis utilities and costs) to prognose or infer an action that a user desires to be automatically performed (e.g., characterizing undefined code 105 with one or more prior codes 120A-n, and operations related thereto).

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein is inclusive of statistical regression that is utilized to develop models of priority.

As will be readily appreciated from the subject specification, the various embodiments can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier (s) can be used to automatically learn and perform a number of functions, including but not limited to characterizing an undefined code 105 with one or more prior codes 120A-n, for example.

As described supra, inferences can be made, and automated operations performed, based on numerous pieces of information. For example, whether a prior code 120A-n and associated attribute 122A-n has similar coding structure, functionality, etc., as an undefined code 105, and accordingly, can characterize the undefined code 105 with a prior code 120A-n.

Example Applications and Use

Figure 9:
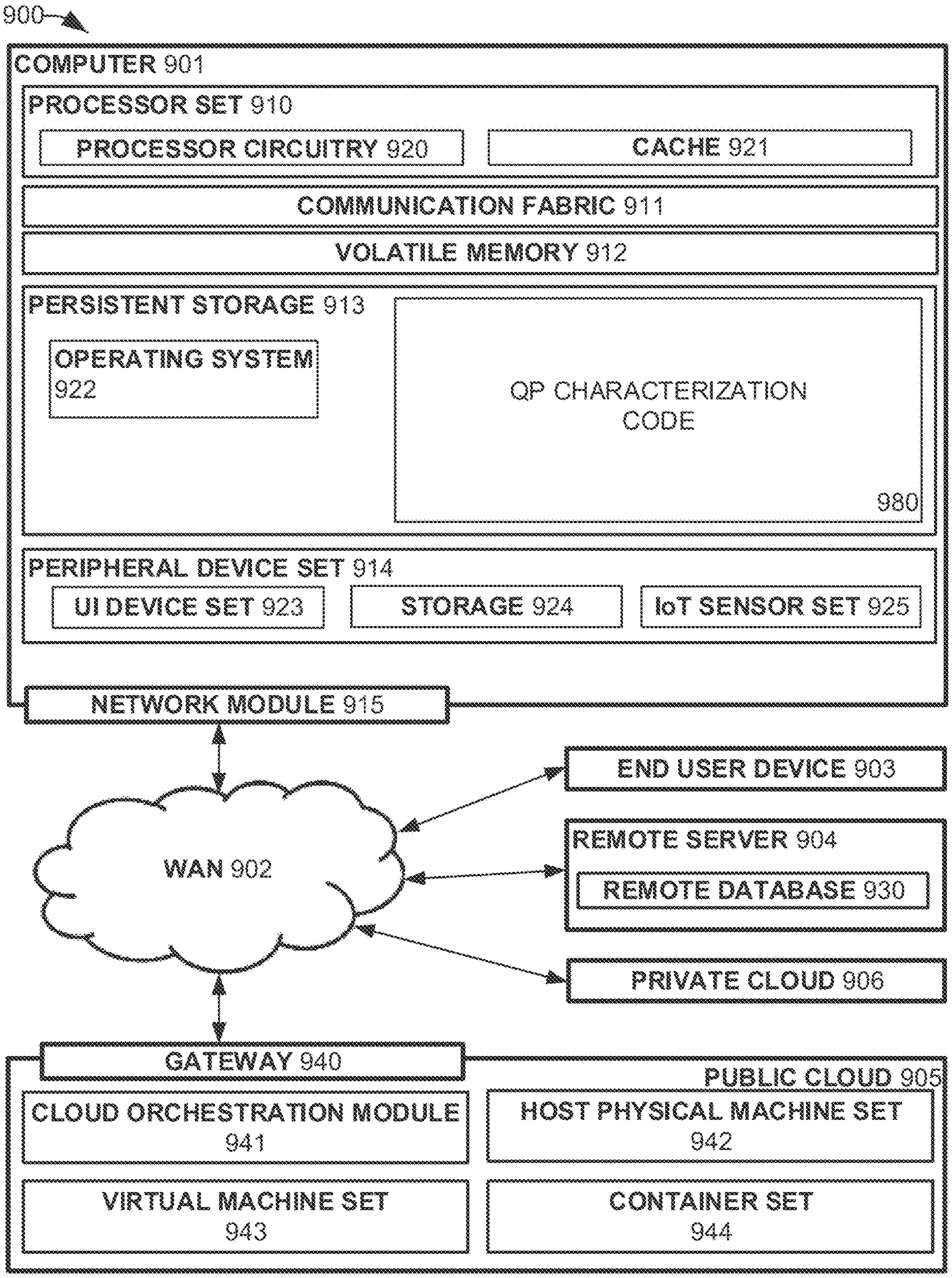
FIG. 9 depicts an example schematic block diagram of a computing environment with which the disclosed subject matter can interact/be implemented at least in part, in accordance with various aspects and implementations of the subject disclosure.
Figure 10:
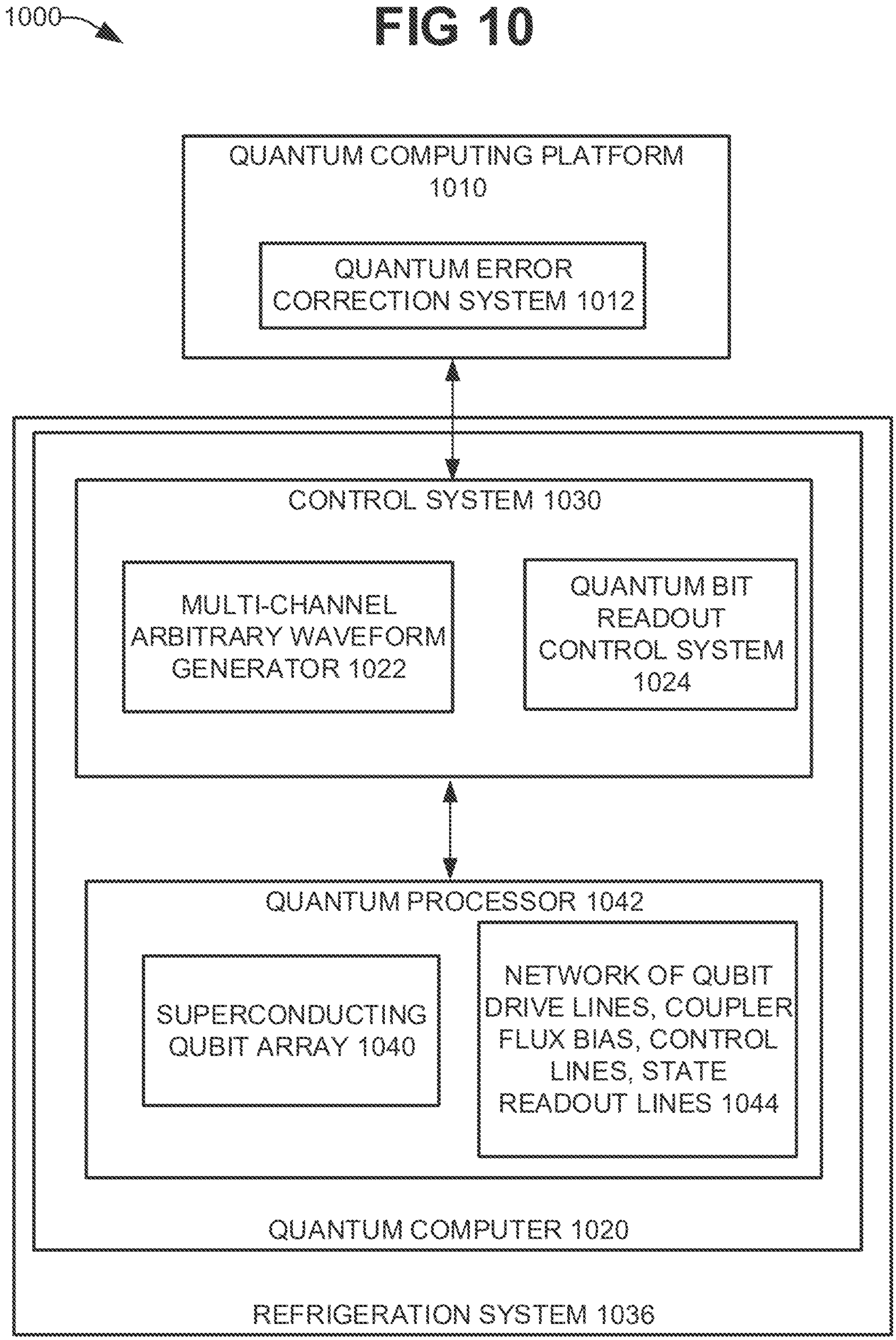
FIG. 10 presents a quantum computing system one which one or more embodiments presented herein can be implemented, in accordance with various aspects and implementations of the subject disclosure.

FIGS. 9 and 10 and the following discussion are intended to provide a brief, general description of a suitable computing environments 900 and 1000 in which one or more embodiments described herein at FIGS. 1-8 can be implemented. For example, various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks can be performed in reverse order, as a single integrated step, concurrently or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium can be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 900 contains an example of an environment for the execution of at least some of the computer code involved in performing the inventive methods, such as automatically characterizing an undefined code (e.g., undefined/first code 105) with previously characterized codes (e.g., prior codes 120A-n), through the application of QP characterization code 980 (e.g., having the functionality of one or more components of code characterization system 110), wherein characterizing the undefined code enables knowledge of the undefined code to be acquired without having to be executed on the quantum computing system. In addition to block 980, computing environment 900 includes, for example, computer 901, wide area network (WAN) 902, end user device (EUD) 903, remote server 904, public cloud 905, and private cloud 906. In this embodiment, computer 901 includes processor set 910 (including processing circuitry 920 and cache 921), communication fabric 911, volatile memory 912, persistent storage 913 (including operating system 922 and block 980, as identified above), peripheral device set 914 (including user interface (UI), device set 923, storage 924, and Internet of Things (IoT) sensor set 925), and network module 915. Remote server 904 includes remote database 930. Public cloud 905 includes gateway 940, cloud orchestration module 941, host physical machine set 942, virtual machine set 943, and container set 944.

COMPUTER 901 can take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 930. As is well understood in the art of computer technology, and depending upon the technology, performance of a computer-implemented method can be distributed among multiple computers and/or between multiple locations. On the other hand, in this presentation of computing environment 900, detailed discussion is focused on a single computer, specifically computer 901, to keep the presentation as simple as possible. Computer 901 can be located in a cloud, even though it is not shown in a cloud in FIG. 9. On the other hand, computer 901 is not required to be in a cloud except to any extent as can be affirmatively indicated.

PROCESSOR SET 910 includes one, or more, computer processors of any type now known or to be developed in the future. Processing circuitry 920 can be distributed over multiple packages, for example, multiple, coordinated integrated circuit chips. Processing circuitry 920 can implement multiple processor threads and/or multiple processor cores. Cache 921 is memory that is located in the processor chip package(s) and is typically used for data or code that should be available for rapid access by the threads or cores running on processor set 910. Cache memories are typically organized into multiple levels depending upon relative proximity to the processing circuitry. Alternatively, some, or all, of the cache for the processor set can be located "off chip." In some computing environments, processor set 910 can be designed for working with qubits and performing quantum computing.

Computer readable program instructions are typically loaded onto computer 901 to cause a series of operational steps to be performed by processor set 910 of computer 901 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 921 and the other storage media discussed below. The program instructions, and associated data, are accessed by processor set 910 to control and direct performance of the inventive methods. In computing environment 900, at least some of the instructions for performing the inventive methods can be stored in block 980 in persistent storage 913.

COMMUNICATION FABRIC 911 is the signal conduction path that allows the various components of computer 901 to communicate with each other. Typically, this fabric is made of switches and electrically conductive paths, such as the switches and electrically conductive paths that make up busses, bridges, physical input/output ports and the like. Other types of signal communication paths can be used, such as fiber optic communication paths and/or wireless communication paths.

VOLATILE MEMORY 912 is any type of volatile memory now known or to be developed in the future. Examples include dynamic type random access memory (RAM) or static type RAM. Typically, the volatile memory is characterized by random access, but this is not required unless affirmatively indicated. In computer 901, the volatile memory 912 is located in a single package and is internal to computer 901, but, alternatively or additionally, the volatile memory can be distributed over multiple packages and/or located externally with respect to computer 901.

PERSISTENT STORAGE 913 is any form of non-volatile storage for computers that is now known or to be developed in the future. The non-volatility of this storage means that the stored data is maintained regardless of whether power is being supplied to computer 901 and/or directly to persistent storage 913. Persistent storage 913 can be a read only memory (ROM), but typically at least a portion of the persistent storage allows writing of data, deletion of data and re-writing of data. Some familiar forms of persistent storage include magnetic disks and solid-state storage devices. Operating system 922 can take several forms, such as various known proprietary operating systems or open-source Portable Operating System Interface type operating systems that employ a kernel. The code included in block 980 typically includes at least some of the computer code involved in performing the inventive methods.

PERIPHERAL DEVICE SET 914 includes the set of peripheral devices of computer 901. Data communication connections between the peripheral devices and the other components of computer 901 can be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 923 can include components such as a display screen, speaker, microphone, wearable devices (such as goggles and smart watches), keyboard, mouse, printer, touchpad, game controllers, and haptic devices. Storage 924 is external storage, such as an external hard drive, or insertable storage, such as an SD card. Storage 924 can be persistent and/or volatile. In some embodiments, storage 924 can take the form of a quantum computing storage device for storing data in the form of qubits. In embodiments where computer 901 is required to have a large amount of storage (for example, where computer 901 locally stores and manages a large database) then this storage can be provided by peripheral storage devices designed for storing large amounts of data, such as a storage area network (SAN) that is shared by multiple, geographically distributed computers. IoT sensor set 925 is made up of sensors that can be used in Internet of Things applications. For example, one sensor can be a thermometer and another sensor can be a motion detector.

NETWORK MODULE 915 is the collection of computer software, hardware, and firmware that allows computer 901 to communicate with other computers through WAN 902. Network module 915 can include hardware, such as modems or Wi-Fi signal transceivers, software for packetizing and/or de-packetizing data for communication network transmission, and/or web browser software for communicating data over the internet. In some embodiments, network control functions and network forwarding functions of network module 915 are performed on the same physical hardware device. In other embodiments (for example, embodiments that utilize software-defined networking (SDN)), the control functions and the forwarding functions of network module 915 are performed on physically separate devices, such that the control functions manage several different network hardware devices. Computer readable program instructions for performing the inventive methods can typically be downloaded to computer 901 from an external computer or external storage device through a network adapter card or network interface included in network module 915.

WAN 902 is any wide area network (for example, the internet) capable of communicating computer data over non-local distances by any technology for communicating computer data, now known or to be developed in the future. In some embodiments, the WAN can be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 903 is any computer system that is used and controlled by an end user (for example, a customer of an enterprise that operates computer 901) and can take any of the forms discussed above in connection with computer 901. EUD 903 typically receives helpful and useful data from the operations of computer 901. For example, in a hypothetical case where computer 901 is designed to provide a recommendation to an end user, this recommendation would typically be communicated from network module 915 of computer 901 through WAN 902 to EUD 903. In this way, EUD 903 can display, or otherwise present, the recommendation to an end user. In some embodiments, EUD 903 can be a client device, such as thin client, heavy client, mainframe computer and/or desktop computer.

REMOTE SERVER 904 is any computer system that serves at least some data and/or functionality to computer 901. Remote server 904 can be controlled and used by the same entity that operates computer 901. Remote server 904 represents the machine(s) that collect and store helpful and useful data for use by other computers, such as computer 901. For example, in a hypothetical case where computer 901 is designed and programmed to provide a recommendation based on historical data, then this historical data can be provided to computer 901 from remote database 930 of remote server 904.

PUBLIC CLOUD 905 is any computer system available for use by multiple entities that provides on-demand availability of computer system resources and/or other computer capabilities, especially data storage (cloud storage) and computing power, without direct active management by the scale. The direct and active management of the computing resources of public cloud 905 is performed by the computer hardware and/or software of cloud orchestration module 941. The computing resources provided by public cloud 905 are typically implemented by virtual computing environments that run on various computers making up the computers of host physical machine set 942, which is the universe of physical computers in and/or available to public cloud 905. The virtual computing environments (VCEs) typically take the form of virtual machines from virtual machine set 943 and/or containers from container set 944. It is understood that these VCEs can be stored as images and can be transferred among and between the various physical machine hosts, either as images or after instantiation of the VCE. Cloud orchestration module 941 manages the transfer and storage of images, deploys new instantiations of VCEs and manages active instantiations of VCE deployments. Gateway 940 is the collection of computer software, hardware and firmware allowing public cloud 905 to communicate through WAN 902.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 906 is similar to public cloud 905, except that the computing resources are only available for use by a single enterprise. While private cloud 906 is depicted as being in communication with WAN 902, in other embodiments a private cloud can be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 905 and private cloud 906 are both part of a larger hybrid cloud.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the Figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

FIG. 10, presents a quantum computing system 1000, according to at least one embodiment, wherein computing system 1000 can comprise/be incorporated into quantum computing system 102. FIG. 10 schematically illustrates the quantum computing system 1000 which comprises a quantum computing platform 1010, a control system 1030, and a quantum processor 1042. In various embodiments, the quantum computing platform 1010 implements software control programs such as a software-based quantum error correction system 1012 to perform a quantum error correction processes, application of source code, etc., as well as perform other software-controlled processes such as qubit calibration operations. In other embodiments, the control system 1030 comprises a multi-channel arbitrary waveform generator 1022, and a quantum bit readout control system 1024. A quantum processor 1042 can comprise one or more solid-state semiconductor chips having one or more qubit arrays 1040 located thereon, and further a network 1044 of qubit drive lines, coupler flux-bias control lines, and qubit state readout lines, and other circuit QED components that may be needed for a given application or quantum system configuration.

In various embodiments, the control system 1030 and the quantum processor 1042 can be disposed in a dilution refrigeration system 1036 which can generate cryogenic temperatures that are sufficient to operate components of the control system 1030 for quantum computing applications. For example, the quantum processor 1042 may need to be cooled down to near-absolute zero, e.g., 10-15 millikelvin (mK), to allow the superconducting qubits to exhibit quantum behaviors. In some embodiments, the dilution refrigeration system 1036 comprises a multi-stage dilution refrigerator where the components of the control system 1030 can be maintained at different cryogenic temperatures, as needed. For example, while the quantum processor 1042 may need to be cooled down to, e.g., 10-15 mK, the circuit components of the control system 1030 may be operated at cryogenic temperatures greater than 10-15 mK (e.g., cryogenic temperatures in a range of 3K-4K), depending on the configuration of the quantum computing system.

In other embodiments, the qubit array 1040 comprises a quantum system of data/auxiliary qubits and qubit couplers. The number of qubits of the qubit array 1040 can be on the order of tens, hundreds, thousands, or more, etc. The network 1044 of qubit drive lines, coupler flux bias control lines, and qubit state readout lines, etc., are configured to apply microwave control signals to qubits and coupler circuitry in the qubit array 1040 to perform various types of gate operations, e.g., single-gate operations, entanglement gate operations (e.g., CPHASE gate operation), perform error correction operations, etc., as well read the quantum states of the qubits. For example, as noted above, microwave control pulses are applied to the qubit drive lines of respective qubits to change the quantum state of the qubits (e.g., change the quantum state of a given qubit between the ground state and excited state, or to a superposition state) when executing quantum information processing algorithms.

Furthermore, as noted above, the state readout lines comprise readout resonators that are coupled to respective qubits. The state of a given qubit can be determined through microwave transmission measurements made between readout ports of the readout resonator. The states of the qubits are read out after executing a quantum algorithm. In some embodiments, a dispersive readout operation is performed in which a change in the resonant frequency of a given readout resonator, which is coupled to a given qubit, is utilized to readout the state (e.g., ground or excited state) of the given qubit.

The network 1044 of qubit drive lines, coupler flux bias control lines, and qubit state readout lines, etc., is coupled to the control system 1030 through a suitable hardware input/output (I/O) interface, which couples I/O signals between the control system 1030 and the quantum processor 1042. For example, the hardware I/O interface may comprise various types of hardware and components, such as RF cables, wiring, RF elements, optical fibers, heat exchanges, filters, amplifiers, isolators, etc.

In some embodiments, the multi-channel arbitrary waveform generator (AWG) 1022 and other suitable microwave pulse signal generators are configured to generate the microwave control pulses that are applied to the qubit drive lines, and the coupler drive lines to control the operation of the superconducting qubits and associated qubit coupler circuitry, when performing various gate operations to execute a given certain quantum information processing algorithm. In some embodiments, the multi-channel AWG 1022 comprises a plurality of AWG channels, which control respective superconducting qubits within the superconducting qubit array 1040 of the quantum processor 1042. In some embodiments, each AWG channel comprises a baseband signal generator, a digital-to-analog converter (DAC) stage, a filter stage, a modulation stage, an impedance matching network, and a phase-locked loop system to generate local oscillator (LO) signals (e.g., quadrature LO signals LO_I and LO_Q) for the respective modulation stages of the respective AWG channels.

In some embodiments, the multi-channel AWG 1022 comprises a quadrature AWG system which is configured to process quadrature signals, wherein a quadrature signal comprises an in-phase (I) signal component, and a quadrature-phase (Q) signal component. In each AWG channel the baseband signal generator is configured to receive baseband data as input (e.g., from the quantum computing platform), and generate digital quadrature signals I and Q which represent the input baseband data. In this process, the baseband data that is input to the baseband signal generator for a given AWG channel is separated into two orthogonal digital components including an in-phase (I) baseband component and a quadrature-phase (Q) baseband component. The baseband signal generator for the given AWG channel can generate the requisite digital quadrature baseband IQ signals which are needed to generate an analog waveform (e.g., sinusoidal voltage waveform) with a target center frequency that is configured to operate or otherwise control a given quantum bit that is coupled to the output of the given AWG channel.

The DAC stage for the given AWG channel is configured to convert a digital baseband signal (e.g., a digital IQ signal output from the baseband signal generator) to an analog baseband signal (e.g., analog baseband signals I(t) and Q(t)) having a baseband frequency. The filter stage for the given AWG channel is configured to filter the IQ analog signal components output from the DAC stage to thereby generate filtered analog IQ signals. The modulation stage for the given AWG channel is configured to perform analog IQ signal modulation (e.g., single-sideband (SSB) modulation) by mixing the filtered analog signals I(t) and Q(t), which are output from the filter stage, with quadrature LO signals (e.g., an in-phase LO signal (LO_I) and a quadrature-phase LO signal (LO_Q)) to generate and output an analog RF signal (e.g., a single-sideband modulated RF output signal).

In some embodiments, the quantum bit readout control system 1024 comprises a microwave pulse signal generator that is configured to apply a microwave tone to a given readout resonator line of a given qubit to perform a readout operation to readout the state of the given qubit, as well as circuitry that is configured to process the readout signal generated by the readout resonator line to determine the state of the given qubit, using techniques known to those of ordinary skill in the art.

The quantum computing platform 1010 comprises a software and hardware platform which comprises various software layers that are configured to perform various functions, including, but not limited to, generating and implementing various quantum applications using suitable quantum programming languages, configuring and implementing various quantum gate operations, compiling quantum programs into a quantum assembly language, implementing and utilizing a suitable quantum instruction set architecture (ISA), performing calibration operations to calibrate the quantum circuit elements and gate operations, etc. In addition, the quantum computing platform 1010 comprises a hardware architecture of processors, memory, etc., which is configured to control the execution of quantum applications, and interface with the control system 1030 to (i) generate digital control signals that are converted to analog microwave control signals by the control system 1030, to control operations of the quantum processor 1042 when executing a given quantum application, and (ii) to obtain and process digital signals received from the control system 1030, which represent the processing results generated by the quantum processor 1042 when executing various gate operations for a given quantum application.

In some exemplary embodiments, the quantum computing platform 1010 of the quantum computing system 1000 may be implemented using any suitable computing system architecture which is configured to implement methods to support quantum computing operations by executing computer readable program instructions that are embodied on a computer program product which includes a computer readable storage medium (or media) having such computer readable program instructions thereon for causing a processor to perform control methods as discussed herein.

The quantum computing platform 1010 comprises a software and hardware platform which comprises various software layers that are configured to perform various functions, including, but not limited to, generating and implementing various quantum applications using suitable quantum programming languages, configuring and implementing various quantum gate operations, compiling quantum programs into a quantum assembly language, implementing and utilizing a suitable quantum instruction set architecture (ISA), performing calibration operations to calibrate the quantum circuit elements and gate operations, etc. In addition, the quantum computing platform 1010 comprises a hardware architecture of processors, memory, etc., which is configured to control the execution of quantum applications, and interface with the control system 1030 to (i) generate digital control signals that are converted to analog microwave control signals by the control system 1030, to control operations of the quantum processor 1042 when executing a given quantum application, and (ii) to obtain and process digital signals received from the control system 1030, which represent the processing results generated by the quantum processor 1042 when executing various gate operations for a given quantum application. In some exemplary embodiments, the quantum computing platform 1010 of the quantum computing system 1000 may be implemented using any suitable computing system architecture which is configured to implement methods to support quantum computing operations by executing computer readable program instructions that are embodied on a computer program product which includes a computer readable storage medium (or media) having such computer readable program instructions thereon for causing a processor to perform control methods as discussed herein.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system, comprising:

a memory operatively coupled to the system, wherein the memory stores computer executable components; and a processor that executes the computer executable components stored in the memory, wherein the computer executable components comprise:

a characterization component configured to:

receive a first code, wherein the first code is configured to be implemented in a quantum computing system;

parse undefined code to identify one or more portions of code having a respectively defined function;

compare the first code with a collection of characterized codes; identify a second code in the collection of characterized codes, wherein the second code has functionality similar to the first code; and characterize the first code with the second code by assigning the characterization of the second code to the first code;

a vector component configured to:

represent each respective code in the collection of characterized codes with a respective vector;

represent the first code with a first vector representation; and a similarity component configured to: determine similarity between the first vector representation and each respective vector in the collection of characterized codes;

identify the respective vector in the collection of characterized codes having a vector value most similar to the vector value of the first vector representation;

determine whether the value of the identified respective vector is sufficiently similar to the value of the first vector representation; and in response to a determination that the identified respective vector and the first vector representation are sufficiently similar, characterize the first code with a characterization of the identified respective vector.

2. The system of claim 1, wherein the first code has not been previously implemented on the quantum computing system.

3. The system of claim 1, wherein the second code has an assigned attribute, the assigned attribute identifies at least one of content or functionality of the second code, and wherein characterizing the first code further comprises applying the assigned attribute of the second code as a first attribute of the first code.

4. The system of claim 1, wherein the similarity component is further configured to:

in response to a determination that the identified respective vector and the first vector representation have insufficient similarity, identify the first vector as having functionality that is not represented by any of the respective vectors in the collection of vectors.

5. The system of claim 1, further comprising a recommendation component configured to:

identify at least one component required by the first code to implement the first code on the quantum computing system;

determine whether the quantum computing system includes the at least one component; and in response to a determination that the quantum computing system does not include the at least one component, recommend incorporation of the at least one component into the quantum computing system.

6. The system of claim 1, further comprising a recommendation component configured to:

identify a function to be performed by the first code when implemented on the quantum computing system;

determining whether the quantum computing system can perform the function in a more efficient manner than the implementation presented in the first code; and in response to a determination that a more efficient manner to achieve the function performed by the quantum computing system, amending the first code to recite the more efficient manner to achieve the function.

7. The system of claim 1, further comprising a parse component configured to:

parse the first code to identify a portion of code within the first code;

extract the portion of code;

compare the portion of code with the collection of characterized codes;

identify a third code in the collection of characterized codes, wherein the third code has functionality similar to the portion of code; and characterize the portion of code with the third code by ascribing the characterization of the third code to the portion of code.

8. The system of claim 1, further comprising a format component, configured to:

receive the first code, wherein the first code is received having a first format and the first code is received prior to characterizing the first code with at least one of the codes in the collection of characterized codes;

receive a requirement for format of the first code to be configured with a second format; and format the first code and the collection of characterized codes with the second format, wherein implementation of the second format prevents determination of the first code with the first format.

9. The system of claim 8, wherein the first format is a high-level programming language and the second format is a low-level programming language.

10. The system of claim 1, further comprising an archive component configured to:

in response to a determination that the first code cannot be characterized with a sufficient degree of confidence, archive the first code; and subsequently re-evaluate the archived first code based on one or more additional characterized codes added to the collection of characterized codes.

11. The system of claim 1, wherein the similarity component is further configured to:

cluster vector representations of the first code and the collection of characterized codes based on similarity of the vector representations.

12. The system of claim 11, wherein the similarity component is configured to apply a k-means clustering algorithm to cluster the vector representations.

13. The system of claim 1, further comprising a parse component configured to:

identify a plurality of portions of code within the first code;

identify a respective characterized code corresponding to each respective portion of code; and assign a respective attribute associated with each respective characterized code to the respective portion of code.

14. The system of claim 13, wherein the characterization component is further configured to:

combine the respective attributes assigned to the plurality of portions of code to generate an omnibus attribute; and characterize the first code based on the omnibus attribute.

15. A computer-implemented method performed by a device operatively coupled to a processor, wherein the method comprising:

receiving a first code, wherein the first code is configured to be implemented in a quantum computing system;

parsing undefined code to identify one or more portions of code having a respectively defined function;

comparing the first code with a collection of characterized codes;

representing each respective code in the collection of characterized codes with a respective vector;

representing the first code with a first vector representation; determining similarity between the first vector representation and each respective vector in the collection of characterized codes;

identifying a second code in the collection of characterized codes based on a respective vector in the collection of characterized codes having a vector value most similar to a vector value of the first vector representation;

determining whether the value of the respective vector is sufficiently similar to the value of the first vector representation; and in response to determining that the value of the respective vector and the value of the first vector representation are sufficiently similar, characterizing the first code with the second code by assigning a characterization of the second code to the first code.

16. The computer-implemented method of claim 15, wherein the first code has previously not been implemented on the quantum computing system.

17. The computer implemented method of claim 15, wherein the second code has an assigned attribute, the assigned attribute identifies at least one of content or functionality of the second code, and wherein characterizing the first code further comprises applying the assigned attribute of the second code as a first attribute of the first code.

18. A computer program product stored on a non-transitory computer-readable medium and comprising machine-executable instructions, wherein, in response to being executed, the machine-executable instructions cause a machine to perform operations, comprising:

receiving a first computer code, wherein the first computer code is configured to be implemented on a quantum computing system;

parsing undefined code to identify one or more portions of code having a respectively defined function;

comparing the first computer code with a collection of characterized computer codes;

representing each respective computer code in the collection of characterized computer codes with a respective vector;

representing the first computer code with a first vector representation; determining similarity between the first vector representation and each respective vector in the collection of characterized computer codes;

identifying a second computer code in the collection of characterized computer codes based on a respective vector in the collection of characterized computer codes having a vector value most similar to a vector value of the first vector representation;

determining whether the value of the respective vector is sufficiently similar to the value of the first vector representation; and in response to determining that the value of the respective vector and the value of the first vector representation are sufficiently similar, characterizing the first computer code with the second computer code by assigning a characterization of the second computer code to the first computer code.

19. The computer program product according to claim 18, wherein the first computer code has previously not been implemented on the quantum computing system.

20. The computer program product according to claim 18, wherein the second computer code has an assigned attribute, the assigned attribute identifies at least one of content or functionality of the second computer code, and wherein characterizing the first computer code further comprises applying the assigned attribute of the second computer code as a first attribute of the first computer code.

* * * * *